(12) United States Patent
Otaka et al.

(10) Patent No.: US 6,470,017 B1
(45) Date of Patent: Oct. 22, 2002

(54) PACKET MULTIPLEXING APPARATUS

(75) Inventors: Akihiro Otaka, Tokyo (JP); Noriki Miki, Tokyo (JP); Norio Tamaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/292,987

(22) Filed: Apr. 16, 1999

(30) Foreign Application Priority Data

Apr. 21, 1998 (JP) .......................................... 10-110777
Apr. 21, 1998 (JP) .......................................... 10-110954

(51) Int. Cl.⁷ .......................... H04L 12/28; H04L 12/56
(52) U.S. Cl. .................... 370/395.71; 370/415; 370/537
(58) Field of Search ................................ 370/394, 412, 370/94.1, 60.1, 532, 535, 537–541, 389, 395.1, 395.7, 395.71, 395.72, 415–416, 419; 709/249

(56) References Cited

U.S. PATENT DOCUMENTS

| | | | | |
|---|---|---|---|---|
| 5,450,410 A | * | 9/1995 | Hluchyj et al. | 370/94.1 |
| 5,519,701 A | * | 5/1996 | Colmant et al. | 370/60.1 |
| 5,898,687 A | * | 4/1999 | Harriman et al. | 370/390 |
| 6,098,109 A | * | 8/2000 | Kotzur et al. | 709/249 |

FOREIGN PATENT DOCUMENTS

| | | |
|---|---|---|
| JP | 2-69048 | 3/1990 |
| JP | 2-142240 | 5/1990 |
| JP | 3-44234 | 2/1991 |
| JP | 6-326721 | 11/1994 |
| JP | 10-051473 | 2/1998 |

OTHER PUBLICATIONS

Martin De Prycker, Asynchronous Transfer Mode Solution for Broadband ISDN, dated 1993, by EllisHorwood Limited, Second Edition, pp. 156–157 and pp. 254–255.*
Jerry D. Gibson, The Communications Handbook, dated 1997, by CRC and IEEE Press, pp. 577–584.*

* cited by examiner

*Primary Examiner*—Chau Nguyen
*Assistant Examiner*—Robert M. Wilson
(74) *Attorney, Agent, or Firm*—Burns, Doane, Swecker & Mathis, L.L.P.

(57) ABSTRACT

A packet multiplexing apparatus is presented for multiplexing packets to be transmitted from a number of user facilities to a local service node in such a way to assure equal access to the output port for all the users. The apparatus is provided with input ports for inputting a packet in a respective input port; a buffer memory provided for each input port for temporary storage of a packet; an output signal transmission circuit for retrieving a packet from each buffer memory in a specific sequence; an output port for transmitting packets output from the output signal transmission circuit; and a retrieval sequencing section for controlling the specific sequence by changing a retrieving order of packets from buffer memories for each complete round of packet retrieval so that a frequency of the retrieving order for each input port is uniformly shared by the input ports.

23 Claims, 19 Drawing Sheets

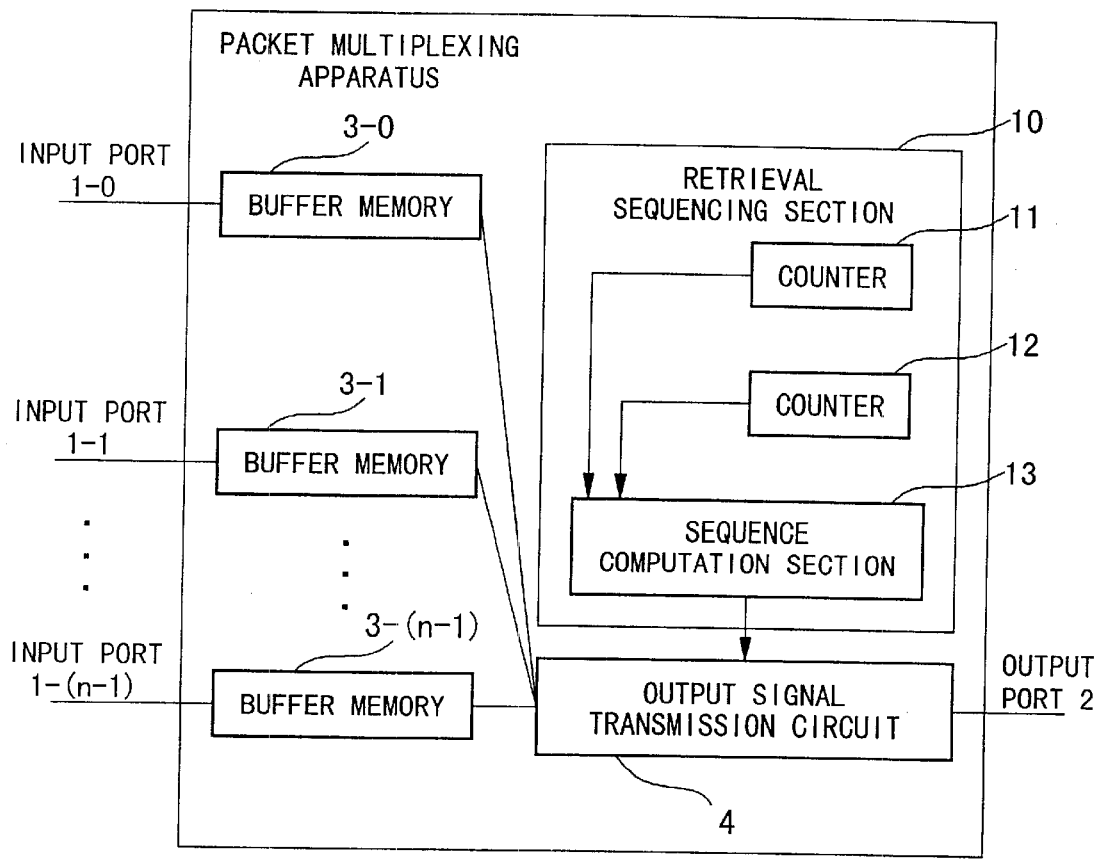

| COUNTER OUTPUT | RETRIEVAL SEQUENCE OF INPUT PORT | | | | COUNTER OUTPUT | RETRIEVAL SEQUENCE OF INPUT PORT | | | |
|---|---|---|---|---|---|---|---|---|---|
| 000 | 0 | 1 | 2 | 3 | 001 | 0 | 1 | 3 | 2 |
| 100 | 1 | 0 | 2 | 3 | 101 | 1 | 0 | 3 | 2 |
| 200 | 2 | 0 | 1 | 3 | 201 | 2 | 0 | 3 | 1 |
| 300 | 3 | 0 | 1 | 2 | 301 | 3 | 0 | 2 | 1 |
| 010 | 0 | 2 | 1 | 3 | 011 | 0 | 2 | 3 | 1 |
| 110 | 1 | 2 | 0 | 3 | 111 | 1 | 2 | 3 | 0 |
| 210 | 2 | 1 | 0 | 3 | 211 | 2 | 1 | 3 | 0 |
| 310 | 3 | 1 | 0 | 2 | 311 | 3 | 1 | 2 | 0 |
| 020 | 0 | 3 | 1 | 2 | 021 | 0 | 3 | 2 | 1 |
| 120 | 1 | 3 | 0 | 2 | 121 | 1 | 3 | 2 | 0 |
| 220 | 2 | 3 | 0 | 1 | 221 | 2 | 3 | 1 | 0 |
| 320 | 3 | 2 | 0 | 1 | 321 | 3 | 2 | 1 | 0 |

PACKET MULTIPLEXING APPARATUS

BACKGROUND OF THE INVENTION

1. Field of the Invention

The present invention relates to a packet multiplexing apparatus for multiplexing packets input from a plurality of input ports and outputting to one output port, and to a method of operating in a communication system comprised by a plurality of network communication facilities connected by branching transmission lines to an opposite local service node.

This application is based on patent application Nos. Hei 2-110954 and Hei 10-110777 filed in Japan, the contents of which are incorporated herein by reference.

2. Description of the Related Art

For conventional packet multiplexing apparatus, the round robin method is applied. In this method, input ports are checked for the presence or absence of packets starting from an input port with a low port number.

The round robin method will be explained with reference to FIG. 10. The packet multiplexing apparatus has n input ports (n is an integer larger than 2) 1-0~1-(n−1) and an output port 2. The input ports are sequentially numbered. In this case, an input port 1-0 designates an input port in location 0, 1-1 in location 1, and similarly input port 1-(n−1) in location (n−1). Each input port is provided with respective buffer memories 3-0 to 3-(n−1). The output signal transmission circuit 4 checks whether the packets are stored in individual buffer memories in the order of increasing port number, and if there is a packet, this packet is sent to output port 2, while if there is no packet, it checks the next buffer memory corresponding to the next higher port number. This is the method of multiplexing used in the conventional packet multiplexing apparatus to multiplex packets input from input ports 1-0~1-(n−1) and outputting multiplexed packets to output port 2.

In the round robin method, when there is an input port that is outputting packets frequently, the input port that is immediately behind the busy port must wait a longer period on average for its packet to be retrieved, compared with the input port immediately ahead of the busy input port. Therefore, differences in the waiting time results for the various input ports.

When operating in a public network system, it is necessary to guarantee fairness of service to all the users connected through individual input ports. However, conventional round robin method could not assure uniform treatment of all input ports.

This problem of unfair packet retrieval will be explained in more detail using an example shown in FIG. 10. Suppose that m is an integer smaller than (n−1), and consider a case that packets are being input in $(m)^{th}$ input port at a higher rate than other input ports which are relatively idle. Waiting times of packets in $(m-1)^{th}$ port and $(m+1)^{th}$ port will be compared in the following.

When a packet arriving in $(m-1)^{th}$ input port can be sent immediately to output port 2, if, $(m)^{th}$ input port is not busy. In comparison, a packet arriving in $(m+1)^{th}$ input port can be sent immediately to output port 2 when $(m)^{th}$ input port is not busy and, additionally, when its buffer memory for $(m)^{th}$ input port is vacant in the next round of checking the $(m)^{th}$ input port. For this reason, the probability of immediate packet output from $(m+1)^{th}$ input port is lower than that from $(m-1)^{th}$ input port. In other words, the average waiting time for sending a packet is longer for a port that is ahead of the busy $(m)^{th}$ input port, i.e. $(m+1)^{th}$ input port, relative to a port that is behind the busy $(m)^{th}$ input port m, i.e. $(m-1)^{th}$ input port.

Therefore, an inherent problem exists in the round robin method that fairness in accessing one output port cannot be guaranteed for all users, in a communication system dependent on conventional packet multiplexing apparatus using round robin method.

One example of systems that utilizes such a packet multiplexing apparatus is a communication system comprised by a plurality of network communication facilities (users) oppositely connected to a local service node (local exchange) through branching transmission lines.

A communication method using such a system will be explained below.

FIG. 11 shows an example of the foregoing communication system including n network communication (com) facilities 110-1~110-n (where n is an integer larger than 2) and a local service node 120 connected through a star coupler 130 with a branching ratio of n:1. That is, network com facilities 110-1~110-n having dedicated optical fiber lines 140-1~140-n are connected in a n:1 ratio through a star coupler 130 to a local service node 120 having an optical fiber line 150. In other words, the local service node 120 is being shared by a plurality of network com facilities 110-1~110-n.

Each of the network corn facilities 110-1~110-n includes network termination units 111-1~110-n for optical-electrical signal conversion and for termination of the signals exchanged between the local service node 120 and the network com facilities 110-1~110-n, and service-function interface units. This example relates to a case of multiplexing of call connections for connection to the trunk network and LAN connections. In this example, interface units are comprised by circuit interfaces 112-1~112-n and LAN interfaces 113-1~113-n. Circuit interfaces 112-1~112-n are connected to respective telephones 114-1~114-n, and LAN interfaces 113-1~113-n are connected to respective computers or line hubs 115-1~115-n.

The local service node 120 is comprised by: local line termination units 121-1~121-n for optical-electrical signal conversion and for termination of signals exchanged between the local service node 120 and network corn facilities 110-1~110-n; a cross connect (XC) unit 122; and the interface units. Similar to the network com facilities, an interface unit is comprised by a circuit interface 123 and a LAN interface 124. The circuit interface 123 is connected to an exchanger 125, and the LAN interface 124 is connected to a router 126.

A method of communication in such a branched transmission line is to use a time compression multiplexing (TCM) method, in which upward signals (from network com facilities to the local service node) and downward signals (from the local service node to network com facilities) are transmitted through the same line but are identified by the differences in their positions on a common time base.

FIG. 12 shows a communication diagram, showing the signal exchanges between the network com facilities 110-1~110-n and the local line termination unit 121, according to the conventional communication method. For simplification, only the case of LAN connection will be explained. Also for simplification, synchronizing frames for the communication channel and optical transmission delay times through optical fibers are omitted. In the case of LAN connection, network com facilities 110-1~110-n share a channel for transmitting the signals.

In this case, transmission and reception of signals are performed in burst cycles, that is, repeated cycles of transmission and reception actions. In a burst cycle, the downward signal channel (for transmitting downward signals from the local line termination unit 121 to the network com facilities 110-1~110-n) and the downward com channel shared by the network com facilities are processed in the time division multiplexing (TDM) mode in the downward channel. And, in the upward channel, upward signal channels, for transmitting signals from the network com facilities 110-1~110-n to the local line termination unit 121, and the upward com channel shared by the network com facilities are similarly processed in the TDM mode.

The example in FIG. 12 shows that four network com facilities 110-1~110-n share one upward corn channel. In order to share the com channel by four network com facilities, those facilities having the data to be sent output respective frame allocation requests to the local line termination unit 121. Responding to the frame allocation requests, the local line termination unit 121 issues a frame transmission approval to each of the requesting facilities. In order to increase the volume of data from a plurality of users that can be transmitted in the upward corn channel, each network com facility includes in the frame allocation request, the information regarding the amount of data to be sent, and the local line termination unit includes, in the frame allocation approval, the information regarding the frame transmission timing and an approved length of frames for transmission.

According to the conventional method of communication, therefore, when the upward com channel is to be shared by the a number of network com facilities, the local line termination unit controls the timing of outputting the user data to the upward com channel and the amount of usage in the upward com channel, and based on the results of such control actions, it is necessary to inform the user facilities on the timing and channel use information. This methodology requires the local line termination unit to use a high-speed control device for performing complex control actions quickly, and a circuitry of a large scale operating at a high-speed so that a large amount of data should be handled.

SUMMARY OF THE INVENTION

An object of the present invention is to provide a packet multiplexing apparatus that guarantees an equal access to one output port from a plurality of input ports, by substantially equalizing the waiting time for a packet to be retrieved from each input port. Another object of the present invention is to achieve the same by allocating an equal bandwidth to each input port.

In the conventional round robin method of packet multiplexing, the order of retrieving packets from input ports is unchanged in all retrieval rounds. This inherent problem in the conventional method is remedied in the present invention by changing the order of retrieving the packets from successive input ports for each round of packet retrieval.

In the present apparatus, the retrieval process is controlled so that the order of retrieving packets from the input ports is allocated to each port (of port 1 to port n) at an identical probability from retrieval 1 to retrieval n, where n is an integer larger than 2.

Furthermore, the retrieval process is controlled so that the frequency of any input port to be placed behind a packet-outputting-port is the same for all input ports 1 to n. In other words, the retrieval method can assure that, even if there is an input port that outputs packets frequently, it can be assured that a particular input port will not always be behind this busy input port. Therefore, each input port is given an equal waiting time before its packet is retrieved.

Also, the retrieval process is controlled so that a total length of packets retrieved from a buffer memory will be less than a specific length for all buffer memories. Or, a ring buffer can be used for each input port so that packets having tail data within a region of the ring buffer will all be retrieved in the order of their arrival. Such a method enables to equalize the bandwidth of all input ports operating within the system.

Another object of the present invention is to provide a method of communication in a communication system comprised by a number of network communication facilities connected oppositely through a branching lines to one local server node, using circuits of a small scale and without the need for high-speed controls.

The feature of the present method is that at least two frame packets to be shared by each network communication facility are defined within one burst cycle for upward communication, and frame packets are allocated to the users in frame packet units.

This method simplifies allocation processing, because it is only necessary to respond to a network facility by instructing the location of the frame packets to be used, thereby eliminating the need for high-speed control devices for undertaking complex control functions required in the conventional method. Thus, the present packet multiplexing apparatus and method enable to manage communication tasks at high-speed based on control circuits of a much smaller scale.

BRIEF DESCRIPTION OF THE DRAWINGS

FIGS. 1A, 1B are block diagrams of a first embodiment of the packet multiplexing apparatus of the present invention.

DESCRIPTION OF THE PREFERRED EMBODIMENTS

Figures 2A, 2B:
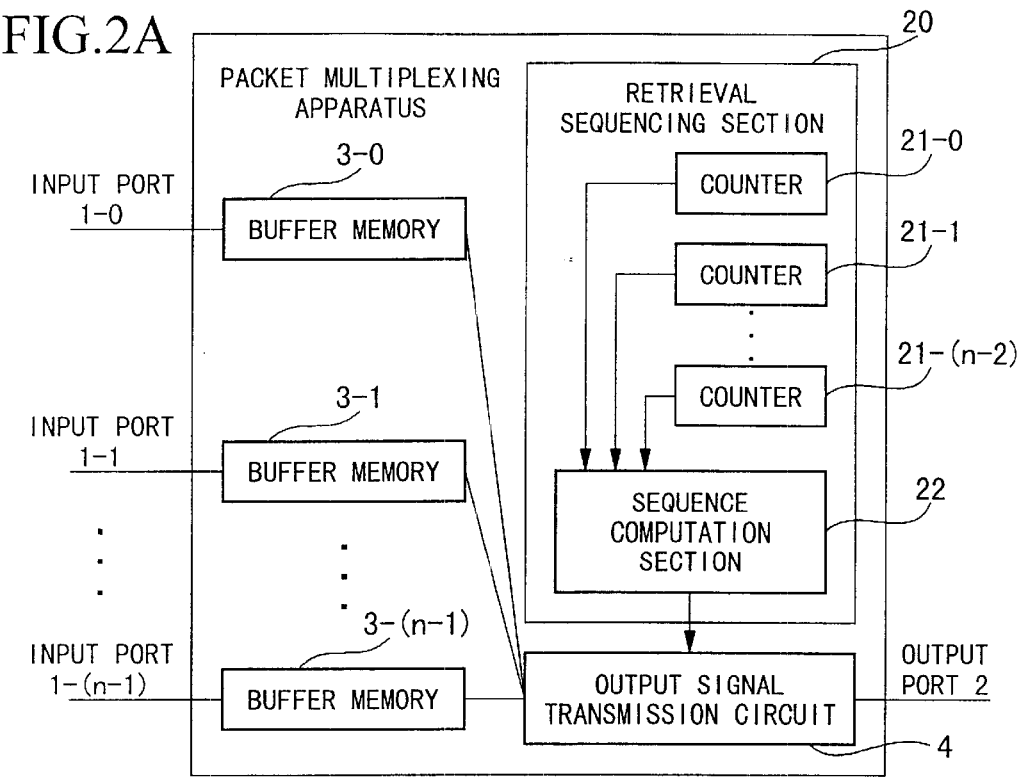
FIGS. 2A, 2B are block diagrams of a second embodiment of the packet multiplexing apparatus of the present invention.

It should be noted that the following embodiments are provided for illustrative purposes and are not meant to be restrictive of the disclosed claims. It should also be emphasized that the combinations of all the features presented in the embodiments are not always necessary depending on the nature of applications.

First, the packet multiplexing apparatus will be explained. After which, the method of communication of the present invention will be explained, in a system comprised by a plurality of network communication facilities and a local service node oppositely connected by branching transmission lines.

Embodiment 1 of Packet Multiplexing Apparatus

FIGS. 1A, 1B show, respectively, the configuration of the first embodiment and a method of packet selection.

As shown in FIG. 1A, the packet multiplexing apparatus is comprised by: n input ports 1-0~1-(n−1), where n is an integer larger than 2, and an output port 2, where each input port is provided with respective buffer memories 3-1~3-(n−1) for temporary storage of packets. A retrieval sequencing section 10 is provided for determining the order of retrieving a packet from the input ports. The retrieval sequencing section 10 instructs the output signal transmission circuit 4 on the order of retrieving a packet from the input ports, and the output signal transmission circuit 4 retrieves packets from the buffer memories 3-1~3-(n−1) in the sequence instructed by the retrieval sequencing section 10. The retrieval sequencing section 10 functions in such a way that the order of packet retrieval is changed after each completed round of input port checking, so that each input port has an equal probability of being in the packet retrieving sequence of retrieval 1, retrieval 2 . . . to retrieval n.

Next, working of the retrieval sequencing section 10 will be explained. In this example, there are $n=2^p$ pieces of input ports (p is an integer larger than 1). Retrieval sequencing section 10 is comprised by a counter 11 for showing the order of checking the input ports and a counter 12 for changing the order of checking. The counter 11 is incremented by one count for each count, from count 0 to count (n−1), and after reaching count (n−1), it returns to count 0. The counter 12 is incremented by one count for each round of counter 11, from count 0 to count (n−1), and after reaching count (n−1), it returns to count 0. The retrieval sequencing section 10 is further provided with a sequence computation section 13 for computing an exclusive-or value for each output bit from the counters 11 and 12, and instructs the output signal transmission circuit 4 on this value.

The operation of the first embodiment will be explained using an example. In this example, it is assumed that there are four input ports identified by numbers 0, 1, 2, and 3 respectively, and counters 11, 12 output numbers 0, 1, 2, or 3. The following stages are involved.

(1) First, the counter 12 shows 0 ("00" shown in binary scale), and the counter 11 is incremented from 0 ("00")to 3 ("11"), and the sequence computation section 13 successively computes an exclusive-or value for each output bit from the counters 11 and 12. The output of the sequence computation section 13 successively shows a sequence 0 ("00"="00" xor "00"; "xor" shows the calculation of exclusive-or for each bit of 2 values), 1 ("01"="00" xor "01"), 2 ("10"="00" xor "10"), 3 ("11"="00" xor "11") so that a packet is retrieved in the sequence of input port 0, input port 1, input port 2 and input port 3.

(2) Next, the counter 12 is incremented by 1 ("01"), and the output of the counter 11 is again incremented from 0 ("00") to 3 ("11"). At this point, the output of sequence computation section 13 shows a sequence 1 ("01"="01" xor "00"), 0 ("00"="01" xor "01"), 3 ("11"="01" xor "10"), 2 ("10"="01" xor "11"), so that a packet is retrieved in the order of input port 1, input port 0, input port 3 and input port 2.

(3) Next, when the output of the counter 12 is incremented to 2, the output of the counter 11 is again incremented from 0 to 3. At this point, the output of the sequence computation section 13 shows a sequence 2 ("10"="10" xor "00"), 3 ("11"="10" xor "01"), 0 ("00"="10" xor "10"), 1 ("01"="10" xor "11"), so that a packet is retrieved in the order of input port 2, input port 3, input port 0 and input port 1.

(4) Next, when the output of the counter 12 is incremented to 3, the output of the counter 11 is again incremented from 0 to 3. At this point, the output of the sequence computation section 13 shows a sequence 3 ("11"="11" xor "00"), 2 ("10"="11" xor "01"), 1 ("01"="11" xor "10"), 0 ("00"="11" xor "11"), so that a packet is retrieved in the order of input port 3, input port 2, input port 1 and input port 0. (5) At this point, the counter 12 returns to 0, and the process returns to stage (1). The results of input port sequence obtained from the exclusive-or operation, based on output bits of the counters 11 and 12, are shown in FIG. 1B.

Focusing on input port 1, the order of packet retrieval is second in stage (1), first in stage (2), fourth in stage (3) and third in stage (4) so that the packet is retrieved at the same frequency in each round of checking the input ports. Furthermore, input port 1 follows behind input port 0 in stage (1), behind input port 3 in stage (2), behind input port 0 in stage (3), and behind input port 2 in stage (4). In other words, no input port constantly follows a particular input port for packet retrieval, as in the case of the round robin method.

By using the packet multiplexing apparatus presented above, the process is controlled so that the packet retrieval sequence is changed after each round of counting the input ports, and that the order of retrieval 1 to retrieval n is allocated to yield the same probability for all the input ports. Therefore, even if a certain input port receives packets at a higher rate than other input ports, the average waiting time for a packet from the time it arrives at an input port to the time it is retrieved from that input port is the same for all the input ports. This method thereby assures that all the input ports are treated fairly for accessing the output port.

Embodiment 2 of Packet Multiplexing Apparatus

Reviewing the results of the first embodiment, it is noted that input port 1 came after input port 0 twice out of the four rounds, and from a viewpoint of a higher probability of being behind a particular input port, complete fairness has not been achieved. To resolve this problem, it is necessary to assure not only that the order of retrieval is allocated at the same probability to all the input ports, but also that the probability of an input port to precede another input port is the same for all input ports 1 to n. To achieve this objective, it is necessary to develop the sequence for n ports in n! (factorial of n) ways.

FIGS. 2A, 2B show the second embodiment of the packet multiplexing apparatus.

As shown in FIG. 2A, the configuration of the packet multiplexing apparatus is the same as that of the first embodiment excepting for the retrieval sequencing section 20. The retrieval sequencing section 20 is comprised by (n−1) pieces of counters 21-0~21-(n-2) and a sequence computation section 22. Counter 21-0 is incremented by 1 from 0 to (n−1) for each checking round of input ports, and returns to 0 after the count reaches (n−1). Counter 21-1 is incremented by 1 from 0 to (n−2) for each round of counter 21-0, and returns to 0 after (n−2). Similarly, counter 21-(n-2) is incremented by 1 from 0 to 1 for each round of counter 21-(n-3), and returns to 0 after 1.

The sequence computation section 22 determines the sequence of packet retrieval by adjusting the count value of the (n−1) pieces of counters 21-0~21-(n-2) according to the following rule. Suppose that input port number for retrieval 1 is the output number of the $0^{th}$ counter 21-0. Input port for retrieval 2 is obtained by arranging the input port numbers 0 to (n−1) from low to high, excepting for the input port which have already been selected, and selecting the input port number as the count value of the first counter 21-1 plus 1. Input port for retrieval 3 is obtained by arranging the input port numbers 0 to (n−1) from low to high, excepting for the input port which have already been selected, and selecting the input port number as the count value of the second counter 21-2 plus 1. Similarly after determining the order of packet retrieval for the remaining (n−1) input ports, input port number for retrieval n is the number remaining in 0 to (n−1) counts.

The operation of the second embodiment will be explained using an example. If it is assumed that there are four input ports identified by numbers 0, 1, 2 and 3. Counter 21-0 outputs numbers 0, 1, 2, 3; counter 21-1 outputs numbers 0, 1, 2; and counter 21-2 outputs numbers 0, 1.

There are twenty four ways of arranging the counter output values, which are shown in FIG. 2B. The digits shown in the counter output column in FIG. 2B represent, from the left, a digit output by counters 21-0, 21-1, 21-2. For example, when the counter output is [000], the sequence of packet retrieval is obtained as follows: first retrieval is from port 0 (output number of the counter 21-0) in a sequence of input ports 0, 1, 2, 3; second is from port 1 which is (0 [output number of the counter 21-2] +1=1, first port) in a sequence of the remaining ports 1,2,3; third is from port 2 which is (0 [output number of the counter 21-2] +1=1, first port) in a sequence of the remaining ports 2,3; and fourth is the remaining port 3. When the counter value is [120], first retrieval is from port 1 (output number of the counter 21-0) of ports 0, 1, 2, 3; second is from port 3 (2 [output number of the counter 21-1] +1=3, third port) of the remaining ports 0,2,3; third is from port 0 (0 [output number of the counter 21-2] +1=1, first port) which is the first of the remaining 0,2; and fourth is from port 2 which is the remaining port.

In FIG. 2B, focusing on input port 0 among the twenty-four ways of sequencing the input ports, first retrieval occurs six times; second retrieval occurs six times; third retrieval occurs six times; and fourth retrieval occurs six times. Also, looking for preferential combinations of ports, it can be noted that a retrieval from input port 0 follows a retrieval from input port 1 six times; follows port 2 six times; and follows port 3 six times.

The same results as presented above for input port 0 are obtained for input ports 1~3.

By using such a packet multiplexing apparatus, the sequence of packet retrieval is allocated in the same probability to each input port for retrieval 1 to retrieval n, and also the probability of one input port to follow another input port is the same for all the input ports 0~(n−1). Accordingly, the average waiting time, a time interval from an entry of a packet to a retrieval of the packet, is the same for all the input ports, thereby assuring fairness of accessing an output port for all the input ports.

Embodiment 3 of the Packet Multiplexing Apparatus

Reviewing the previous embodiments, the first embodiment dealt with a case of determining the retrieval sequence in a plurality of input ports n, represented by $n^p$ (p is an integer larger than 1), using a retrieval sequencing section 10 having two counters. The second embodiment dealt with a case of determining the retrieval sequence in a plurality of counters. In the third embodiment to be presented, the number of input ports can be any integer and need not necessarily be based on a power of 2. In this case, a table is prepared so that the a sequence of packet retrieval, 1~n, is allocated in the same probability for each input port. The retrieval sequence is then decided based on this table.

The third embodiment apparatus will be described in more detail.

Figure 3:
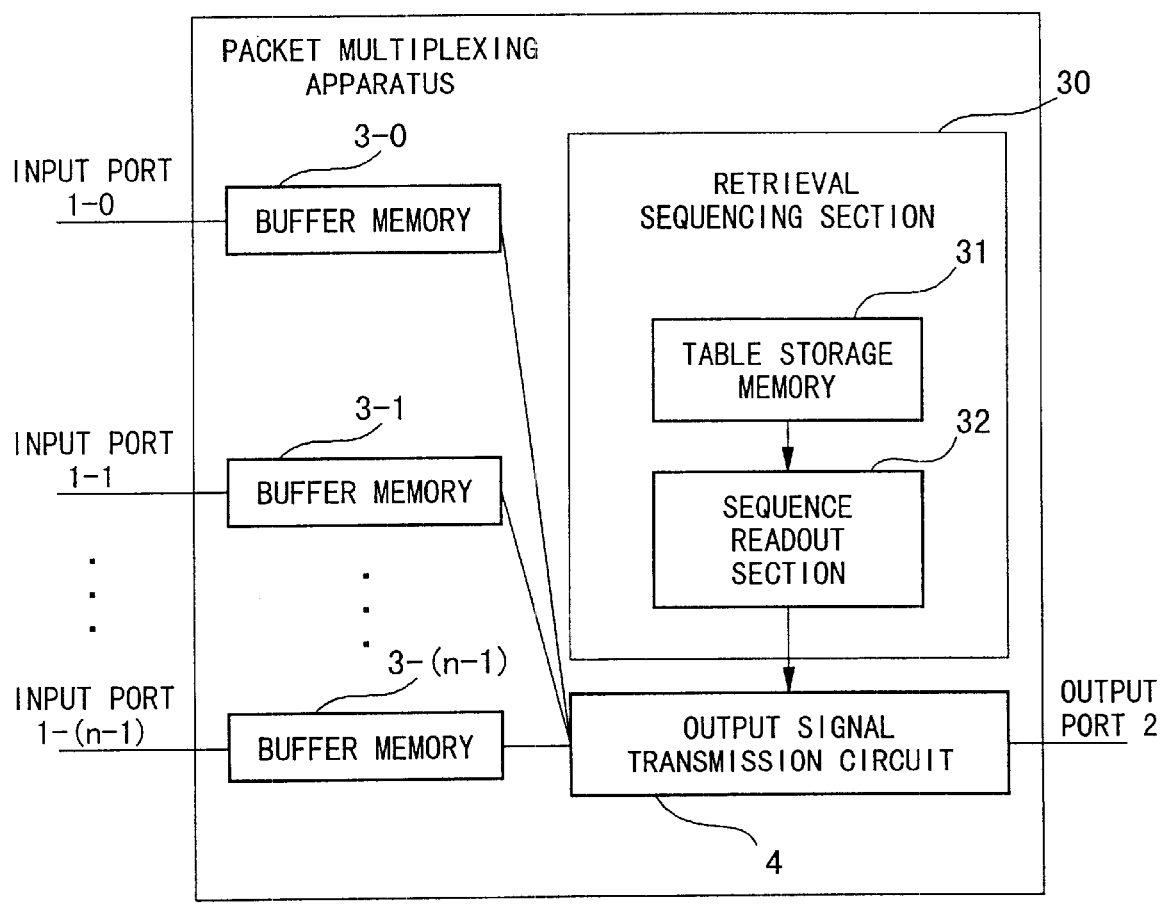
FIG. 3 is a block diagram of a third embodiment of the packet multiplexing apparatus of the present invention.

As shown in FIG. 3, the apparatus has the same components as the first embodiment, except for the retrieval sequencing section 30. The retrieval sequencing section 30 has a table storage memory 31 having a table giving a retrieval sequence so that the order of the retrieval ports is changed for each retrieval round for all the input ports, and that each retrieval, retrieval 1 to retrieval n, has the same probability of being allocated to an input port. The retrieval sequencing section 30 has a sequence readout section 32 to read this table in succession, and instructs the output signal transmission circuit 4 according to the read value.

The table stored in the table storage memory 31 contains a retrieval sequence so as to allocate every input port at the same probability to retrieval 1 as to retrieval n. For example, the table may contain a sequence computed according to $2^p$ ways of arranging the $2^p$ input ports explained in the first embodiment, or according to n! ways of arranging the n pieces of input ports, explained in the second embodiment. It is also permissible to use a table based on other methods to compute the sequence of arranging n input ports in n ways. Also, all the combinations can be realized by using a table based on arranging n input ports in n! ways.

Embodiment 4 of Packet Multiplexing Apparatus

In the embodiments presented so far, a retrieval sequence was determined for each input port, regardless of the presence or absence of a packet in each input port. In the fourth embodiment, only those input ports having a packet in the respective buffer memory are given an approval for packet retrieval.

Figure 4:
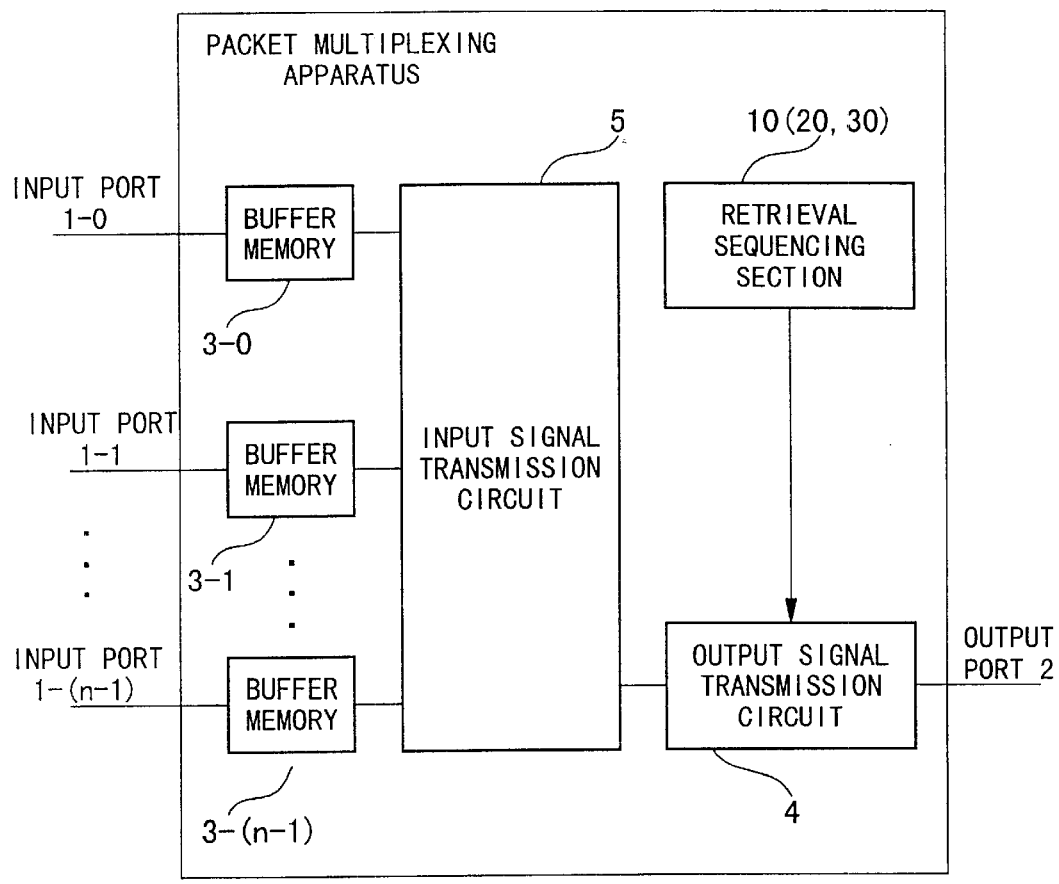
FIGS. 4A, 4B are block diagrams of a fourth embodiment of the packet multiplexing apparatus of the present invention.

FIGS. 4A, 4B illustrate the packet multiplexing apparatus of Embodiment 4, and its actions. As shown in FIG. 4A, n input ports (n in an integer larger than 2) 1-0~1-(n−1), and one output port 2 are provided. Each input port is provided with a buffer memory 3-0~3-(n−1), a retrieval sequencing section 10 (or 20 or 30), an output signal transmission circuit 4, and an input signal transmission circuit 5.

The operation of the apparatus will be explained below. First, when a packet arrives at an input port, the packet is placed in the respective buffer memory while the input signal transmission circuit 5 sends a packet-note, together with own input port identification (ID), to the output signal transmission circuit 4 informing that a packet is in the buffer memory. The output signal transmission circuit 4 authorizes those input ports that sent a packet-note to output the packet according to the sequence given by the retrieval sequencing section 10 (or 20 or 30). The retrieval sequencing section changes the order of authorized input ports for each round of checking the authorized input ports so that all the input ports shares the packet output sequence in the same frequency.

The retrieval sequencing section 10 (or 20 or 30) follows the steps described in the first (or second or third) embodiment to specify a sequence of retrieval 1 to retrieval n, regardless of the presence or absence of the packet in the n pieces input ports. Then, only those input ports that have sent a packet-note are selected and are allowed to output packets in the derived retrieval sequence.

For example, suppose that a retrieval sequence shown in FIG. 1B has been determined. The serial output stream is shown in FIG. 4B. If, in stage (3) for example, input port 0 receives an approval to output a packet and is outputting a packet. At this point, it is supposed there is no packet in the buffer memory of input port 3, and that input ports 1 and 2 have notified that each has a packet. Here, output signal transmission circuit 4 authorizes input port 1 to output the packet via the input signal transmission circuit 5, and if input port 3 has not sent a packet-note while input port 1 is outputting the packet, then, input port 3 is skipped and input port 2 is authorized to output the packet. Accordingly, by permitting only those input ports, that have sent a packet-note to the output signal transmission circuit 4, to output a packet, there is no necessity for checking the presence or absence of a packet in buffer memories of all the input ports. Therefore, the multiplexing productivity is improved. Also, by using such a packet multiplexing apparatus, it is possible to control the retrieval process so that the frequency of being in the packet output position will be shared equally by all the input ports.

Embodiment 5 of Packet Multiplexing Apparatus

In all the embodiments presented so far, the number of packets that are retrieved from each input port in one retrieval has not been restricted in particular. In the fifth embodiment, the number of packets is restricted so that the length of the packet retrieved in one retrieval operation is uniform for all the input ports.

Figure 5:
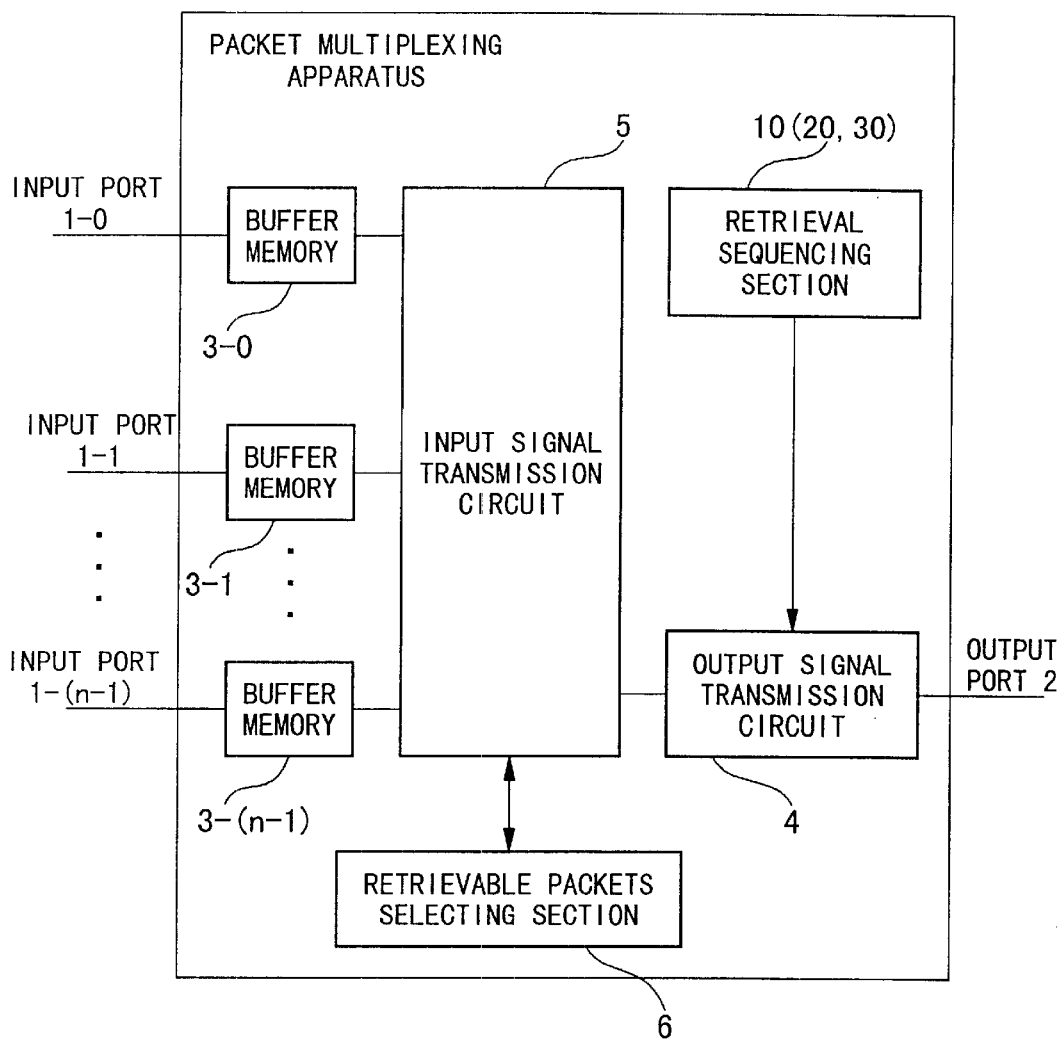
FIG. 5 is a block diagram of a fifth embodiment of the packet multiplexing apparatus of the present invention.

FIG. 5 shows a block diagram of the fifth embodiment apparatus. The apparatus has n (an integer larger than 2) input ports 1-0~1-(n−1) and one output port 2. Further, the input ports are provided with respective buffer memories 3-0~3-(n−1) for temporary storage of a packet. The apparatus also comprises a retrieval sequencing section 10 (or 20 or 30), an output signal transmission circuit 4, an input signal transmission circuit 5, and a retrievable packets selecting section 6.

The operation of the apparatus will be explained below. First, when a packet arrives in an input port, the packet is stored in the respective buffer memory while the input signal transmission circuit 5 sends a packet-note together with the respective input port ID to the output signal transmission circuit 4. The input signal transmission circuit 5 also sends the relevant input port number and the packet length information to the retrievable packets selecting section 6. Next, the output signal transmission circuit 4 authorizes those input ports, that have sent the packet-note, to retrieve a packet in a sequence determined by the retrieval sequencing section 10 (or 20 or 30). The retrieval sequencing section 10 changes the sequence of authorized input ports for each round of checking the authorized input ports, and controls the retrieval process so that there will be no difference in the frequency of any input ports being in the packet output sequence.

Here, for those input ports that have sent a packet-note, if another packet arrives before the authorization is received, the newly arrived packet is added and stored in the relevant buffer memory, then the input signal transmission circuit 5 sends the packet length information of the new packet to the retrievable packets selecting section 6.

The retrieval sequencing section 10 (or 20 or 30) follows the steps described in the first embodiment (or second or third embodiment) to specify sequences of retrieval from retrieval 1 to retrieval n, regardless of the presence or absence of the packet in the n pieces input ports. Then, only those input ports that have sent a packet-note are selected and are allowed to output packets according to the derived retrieval sequence.

The retrievable packets selecting section 6 calculates a sum of packet lengths for each input port, by adding the new packet lengths as they arrive according to the packet length information received in the respective input ports. The number of allowable packets is determined by the retrievable packets selecting section 6 so that the sum of the packet length would be less than a pre-determined value, and this data is sent to the input signal transmission circuit 5. An input port receiving a frame transmission approval sends out the number of packets determined by the retrievable packets selecting section 6. At this stage, if the buffer memory contains a number of packets that is higher than the permitted number of packets determined by the retrievable packets selecting section 6, the packets that have not been output are to be left behind, and the relevant input port must wait for the next approval.

Figure 6:
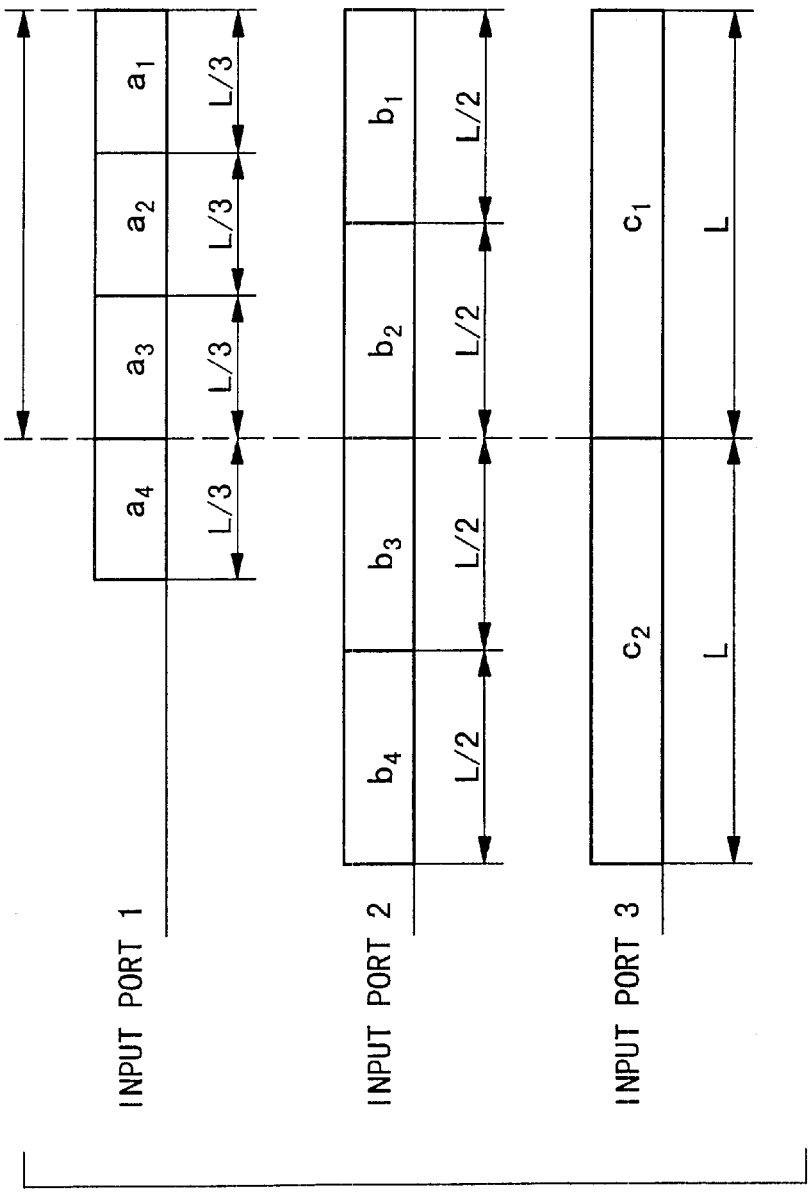
FIG. 6 is a diagram to illustrate the communication actions of the packet multiplexing apparatus shown in FIG. 5.

A specific example of operation of the sixth embodiment apparatus will be presented with reference to FIG. 6. In this example, there are three input ports, and the packet length that can be output from each input port in one burst cycle is a maximum length L. Suppose that: input port 1 receives four packets of L/3 length each, in the order of a1, a2, a3, a4; input port 2 receives four packets of L/2 length each, in the order of b1, b2, b3, b4; input port 3 receives two packets of L length each, in the order of c1, c2. These data are stored in the respective buffer memories.

Each time a packet is received in the respective input ports, the input signal transmission circuit 5 notifies the retrievable packets selecting section 6 that: input port 1 received a packets of packet length L/3; input port 2 received a packet of L/2; and input port 3 received a packet of packet length L.

The retrievable packets selecting section 6 calculates a number of retrievable packets for each input port, based on the notified packet length and the pre-determined packet length L. This process will be explained for the case of operating input port 1. The retrievable packets selecting section 6 sums the notified packet lengths in the order of packet a1, packet a2 and so on. Because the packet length sum for packets a1, a2, a3 is equal to the maximum allowable packet length L, the retrievable packets selecting section 6 determines that the number retrievable packets from input port 1 is three. Similarly, the retrievable packets selecting section 6 determines the number of retrievable packets for input port 2 to be two packets, and that for input port 3 to be one packet.

The retrievable packets selecting section 6 then sends the information regarding the respective number of retrievable packets to the input signal transmission circuit 5. It is to be noted that the retrievable packets selecting section 6 erases the packet information (length data and others) on the retrieved packets from the respective buffer memories so as to avoid duplication in processing.

Next, suppose that input port 1 receives a frame transmission approval, then input port 1 sends the packets a1, a2, a3 in the order of their arrival. Similarly, when input port 2 receives an approval, it sends the packets b1, b2 in the order their arrival. When input port 3 receives an approval, it sends packet c1 that arrived first.

By following such a procedure, the packet multiplexing apparatus of this embodiment equalizes the operational bandwidth of each input port.

Here, A packet having a maximum packet length can be output by making the pre-determined packet length sum longer than the maximum packet length. And also a packet having a packet length longer than the pre-determined length can be output by selecting larger number, number 1 or number of packets whose packet length sum is equal to or less than the pre-determined packet length, and setting the selected number as outputting number of packets.

In this example, the input signal transmission circuit 5 outputs packet notices and, in response, the output signal transmission circuit 4 authorizes packet retrievals for the input ports (as in the case of the fourth embodiment), but the input ports may be sequenced regardless of the presence of packets in the input ports (as embodied in the first to third embodiments).

By using such a packet multiplexing apparatus, the bandwidth can be made equal among the input ports, so that input ports outputting long packet frequently can be equalized against input ports outputting short packets frequently.

Embodiment 6 of Packet Multiplexing Apparatus

The sixth embodiment of the packet multiplexing apparatus uses ring buffers for buffer memory to control the number of packets to be output from the input ports to the output port.

Figure 7A:
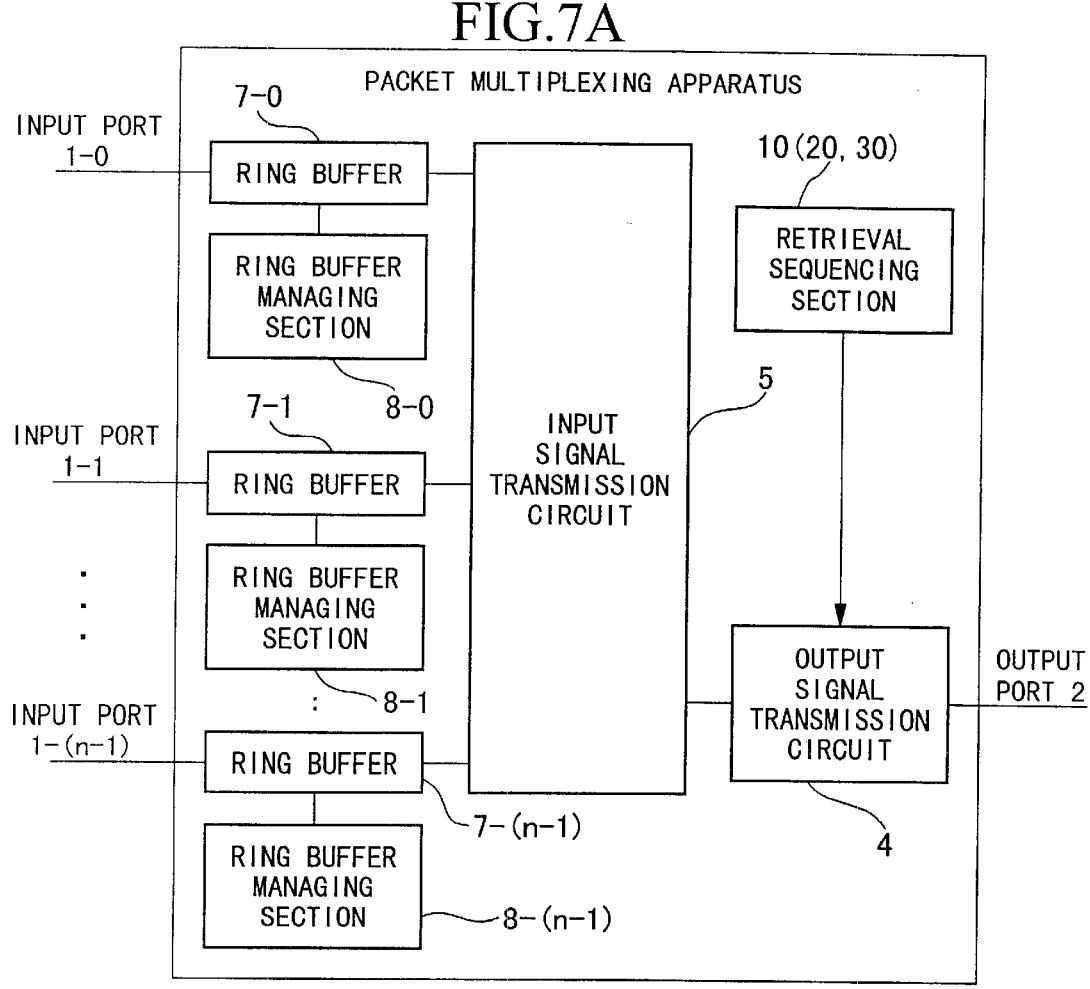
FIGS. 7A, 7B are block diagrams of a sixth embodiment of the packet multiplexing apparatus of the present invention.
Figure 7B:
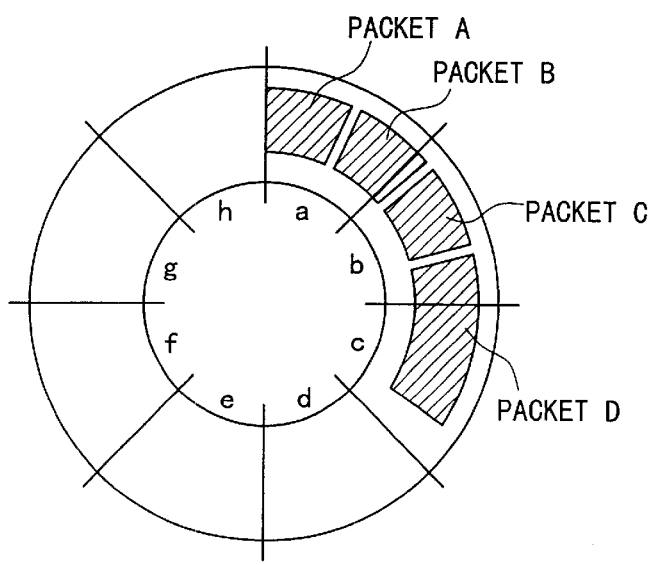

FIGS. 7A, 7B show a block diagram of the apparatus. As shown in FIG. 7A, the apparatus is comprised by n (an integer larger than 2) input ports 1-0~1-(n−1) and one output port 2. Each input port is provided with a ring buffer 7-0~7-(n−1) for temporary storage of packets. Each ring buffer is controlled by a ring buffer managing section 8-0~8-(1-n). In this example, one managing section is provided for each ring buffer but it is possible to configure so that one managing section manages all the ring buffers. The apparatus also has a retrieval sequencing section 10 (or 20 or 30), an output signal transmission circuit 4 and an input signal transmission section 5.

The operation of the apparatus will be explained below. First, when a packet arrives at an input port, the packet is placed in the respective buffer memory while the input signal transmission circuit 5 sends a packet-note, together with own input port ID, to the output signal transmission circuit 4 informing that a packet is in the buffer memory. The output signal transmission circuit 4 authorizes those input ports that sent a packet-note to output the packet according to the sequence given by the retrieval sequencing section 10 (or 20 or 30). The retrieval sequencing section changes the order of the authorized input ports for each round of counting the authorized input ports so that the frequency of being in the packet output position will be shared equally by all the input ports. Here, for those input ports that have sent a packet-note, if another packet arrives before the authorization is received, the newly arrived packet is added and stored in the relevant ring buffer.

The retrieval sequencing section 10 (or 20 or 30) follows the steps described in the first (or second or third) embodiment specifies a sequence of retrieval from retrieval 1 to retrieval n, regardless of the presence or absence of the packet in the n pieces input ports. Then, only those input ports that have sent a packet-note are selected and are allowed to output packets according to the derived retrieval sequence.

FIG. 7B shows an example of the way the packets are stored in the ring buffer memory. The ring buffer memory is divided into regions of a pre-determined length (capacity). In this example, the ring is divided into eight regions from region a to region h. The order to storage in the ring memory is clockwise. When a packet A arrives in an input port, packet A is memorized in its own ring buffer as illustrated. Initially, there are no packets in the ring buffer, and the ring buffer managing section 8 has region a in its memory, and the first packet to be memorized is placed in the leading area of region a. When packets B, C and D are successively input to the ring buffer, they are successively memorized inside the ring buffer as illustrated. The ring buffer managing section 8 has region a in its memory, and when a frame transmission approval is given to an input port that corresponds to this ring buffer, those packets having the tail data within the region a are successively output to the output port 2. In this example, only the packet A is output.

The ring buffer managing section 8 then takes region b (adjacent to region a) in its memory. When this ring buffer receives a frame transmission approval, those packets having the tail data within region b (in this example, packets B, C) are successively output to the output port 2. Next, the ring buffer managing section 8 takes region c in its memory. This process is repeated for all the packets memorized in this ring buffer to output the packets stored in this ring buffer memory.

In this case, by allowing the length of each region in the ring buffer to be longer than the maximum packet length in the data, that are arriving, and when a sufficient number of packets are in the ring buffer of each input port, the region stored in the ring buffer managing section is shifted by one region, each time a frame transmission approval is given. In other words, the operational bandwidth of each input port has, on average, been equalized by this ring buffer arrangement. By using such a multiplexing apparatus, it is possible to equalize the transmission bandwidth of each input port, thereby enabling to equalize the transmission bandwidth of various input port that are outputting long packets frequently and those that are outputting short packet frequently.

Embodiment 7 of Packet Multiplexing Apparatus

The packet multiplexing apparatus in the seventh embodiment is based on a passive double star (PDS) optical access system, which is a type of communication systems.

Figure 8:
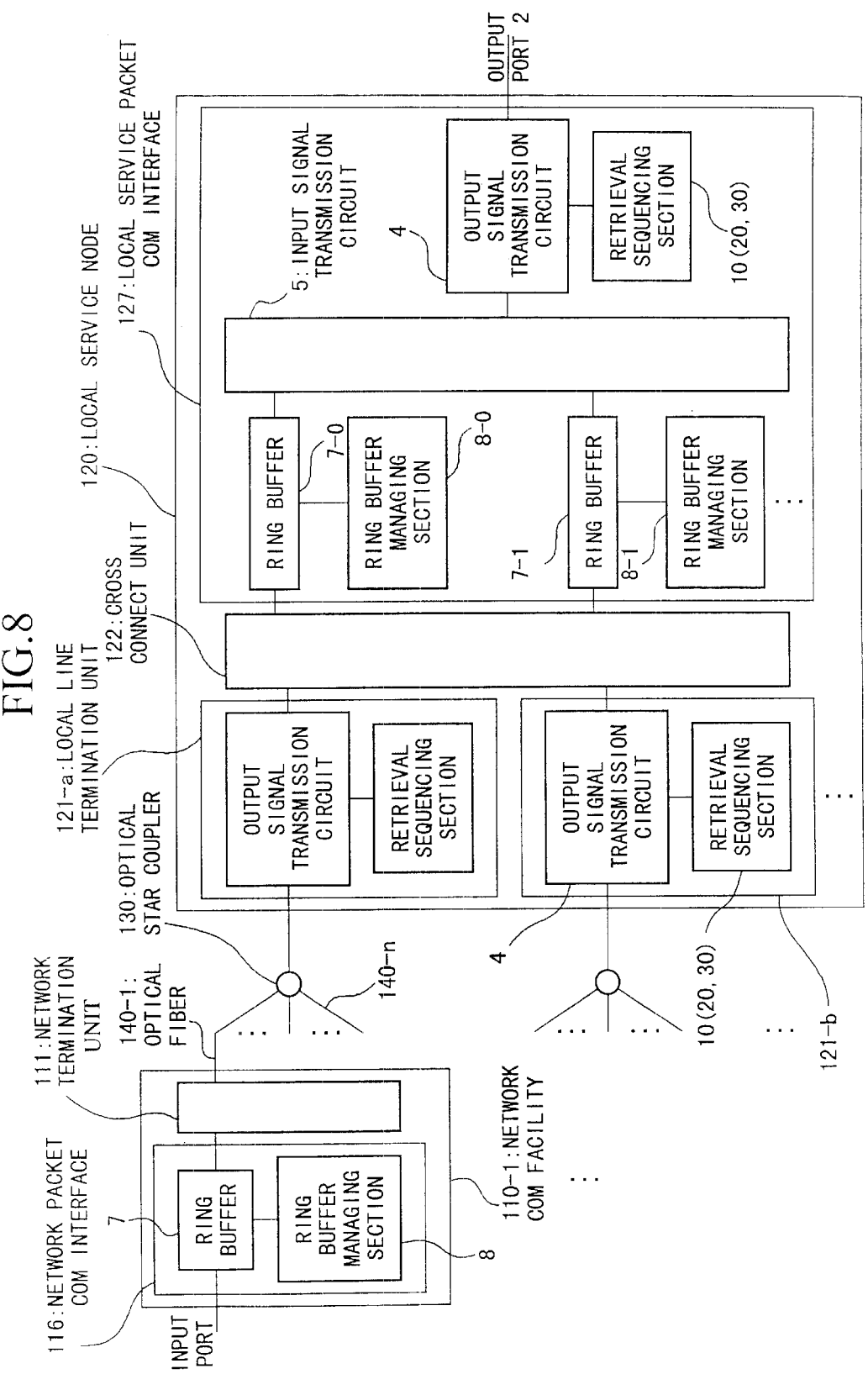
FIG. 8 is a block diagram of a seventh embodiment of the packet multiplexing apparatus of the present invention.

FIG. 8 shows a block diagram of the packet multiplexing apparatus based on PDS system. The PDS system is comprised by a plurality of network com facilities 110-1, . . . that are connected to an opposing local line termination unit 121 through a star coupler 130 in an n:1 branching ratio.

Each network com facility is comprised by a network termination unit 111 for optical-electrical signal conversion and for termination of the signals exchanged between the local service node 120 and the network com facilities 110-1; and a network packet communication (com) interface 116.

The local service node 120 is comprised by: local line termination units 121-*a*, 121-*b*, . . . for terminating channel signals and optical signals to the network com facilities; a cross connect unit 122 for separating and multiplexing com channels and signal channels sent from a plurality of local line termination units; and local service packet communication (com) interface 127.

Here, the network packet com interface 116 and the local packet com interface 127 have at least one packet input/output port. Also, the local packet com interface 127 is connected to one or more than two local line termination units through the cross connect unit 112. To simplify the explanation, the system is assumed that the network packet com interface 116 has one input port and the local service packet communication interface 127 has one output port.

Figure 11:
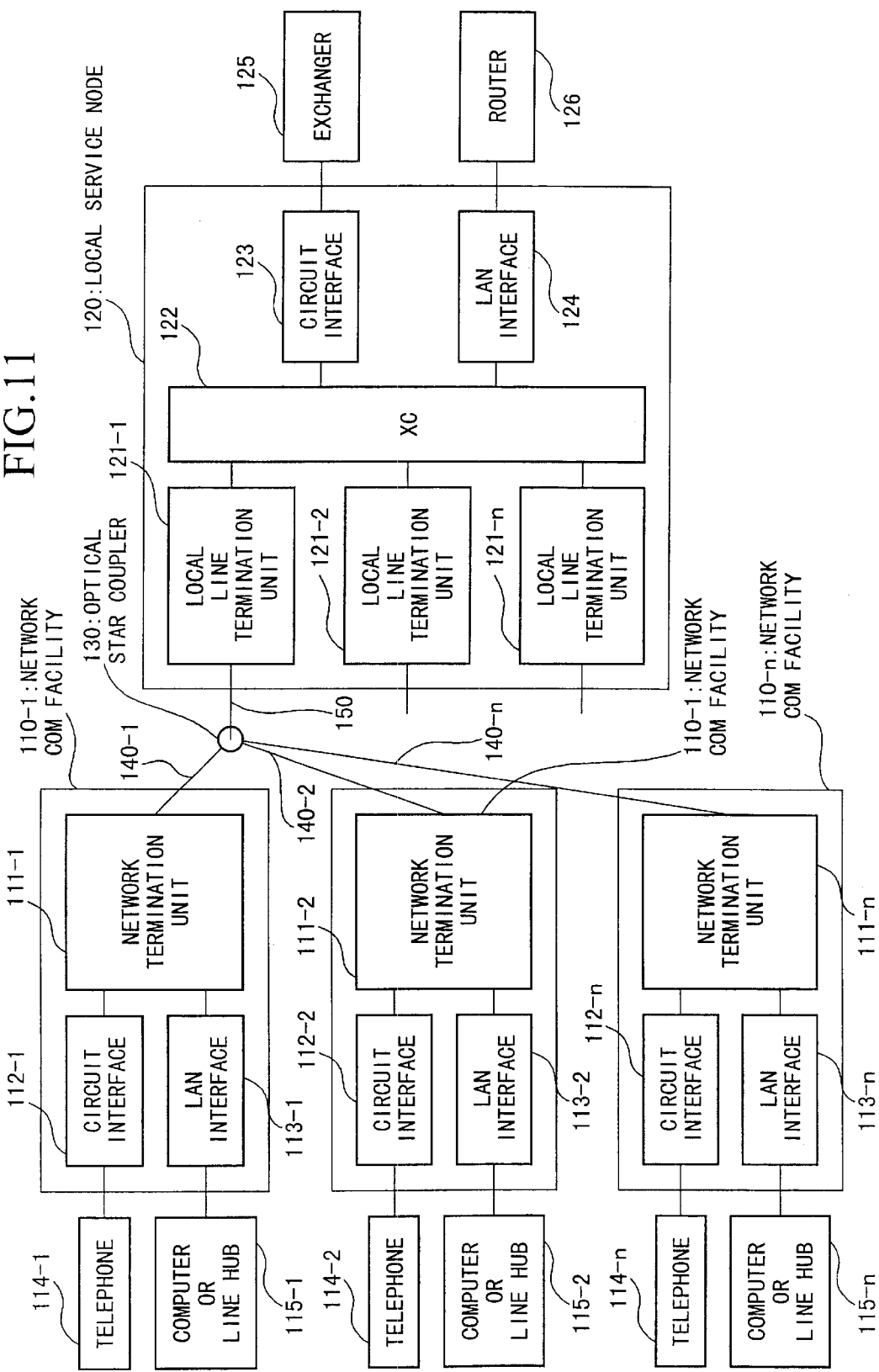
FIG. 11 is an example of the component configuration in the packet multiplexing apparatus.
Figure 12:
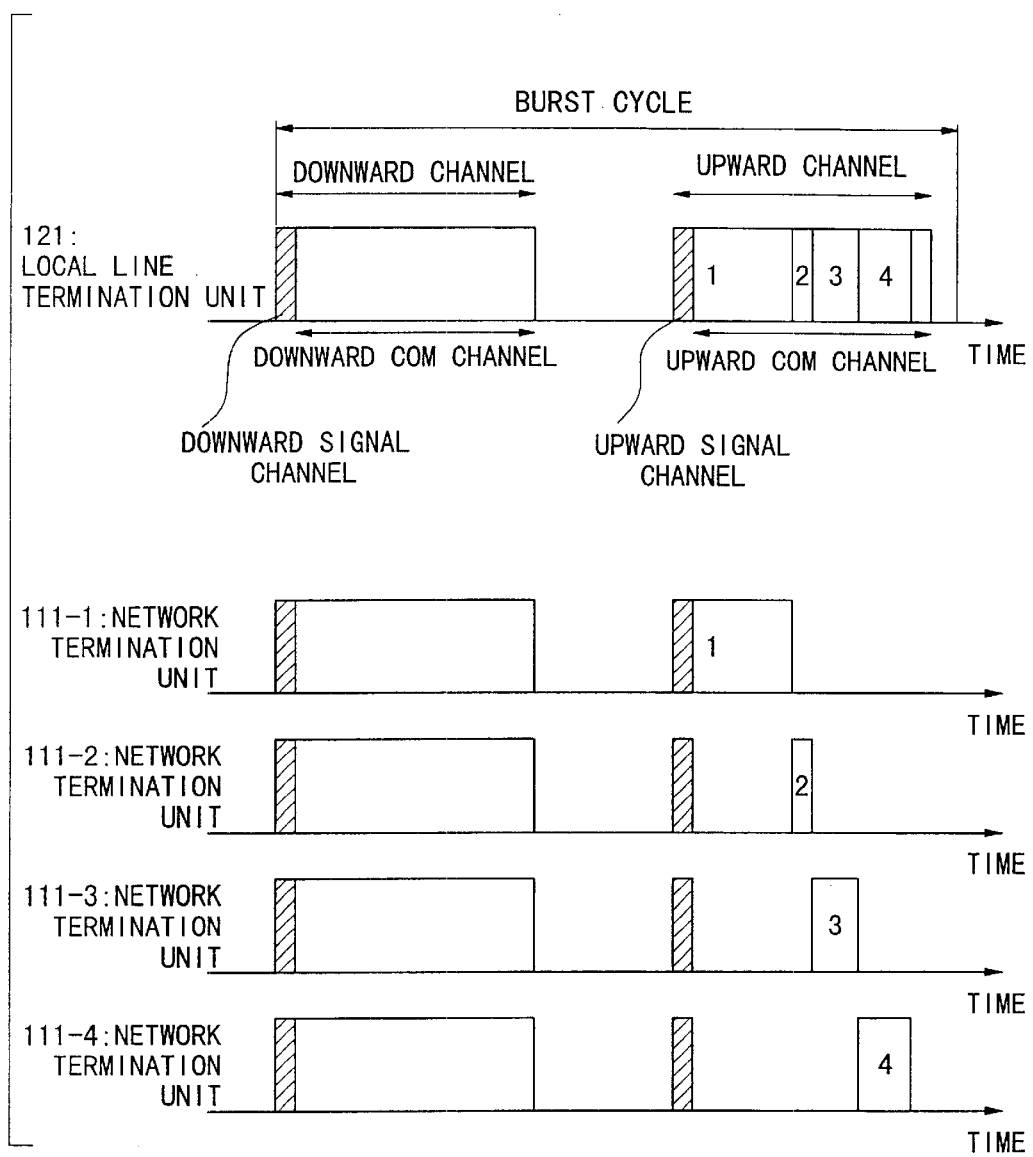
FIG. 12 is a diagram to illustrate the communication actions in the conventional packet multiplexing method of the present invention.

Also, the network packet corn interface 116 corresponds to the IAN interface 113-1, . . . in FIG. 11, and the local packet communication interface 127 corresponds to the LAN interface 124 in FIG. 11.

Each network packet communication interface is provided with a respective ring buffer 7 and a ring buffer managing section 8, as in Embodiment 6. Each of the local line termination units 121-*a*, 121-*b*, . . . is provided with a retrieval sequencing section 10 (or 20 or 30) and output signal transmission circuit 4. In other word, the packet multiplexing apparatus of Embodiment 6 is comprised a combination of the network com facilities 110-1, . . . ; optical fibers 140-1~140-n branched through the star coupler 130; and the local line termination units 121. The operation of such an apparatus is the same as the explanation provided in Embodiment 6 and will not be duplicated here.

The packet multiplexing apparatus so constructed will guarantee fairness of packet output for a plurality of network termination units connected to a single local line termination unit.

Next, local service packet com interface 127 will be explained. This interface 127 has an input port for each of a plurality of local line termination units 121-*a*, 121-*b*, . . . , and one output port 2. The interface 127 includes respective ring buffers 7-0, 7-1, . . . , and respective ring buffer managing section 8-0, 8-1, . . . for each input port, similar to the one presented in Embodiment 6; an output signal transmission circuit 4 and retrieval sequencing section 10 (or 20 or 30). The interface 127 also constitutes a component of the packet multiplexing apparatus similar to the one presented in Embodiment 6, and the operation of this apparatus is also the same as the operation described in Embodiment 6, and will not be duplicated here.

Accordingly, fairness of packet output for the local line termination units 121-*a*, 121-*b*, . . . connected to one local packet com interface 127 can be guaranteed.

Figure 9:
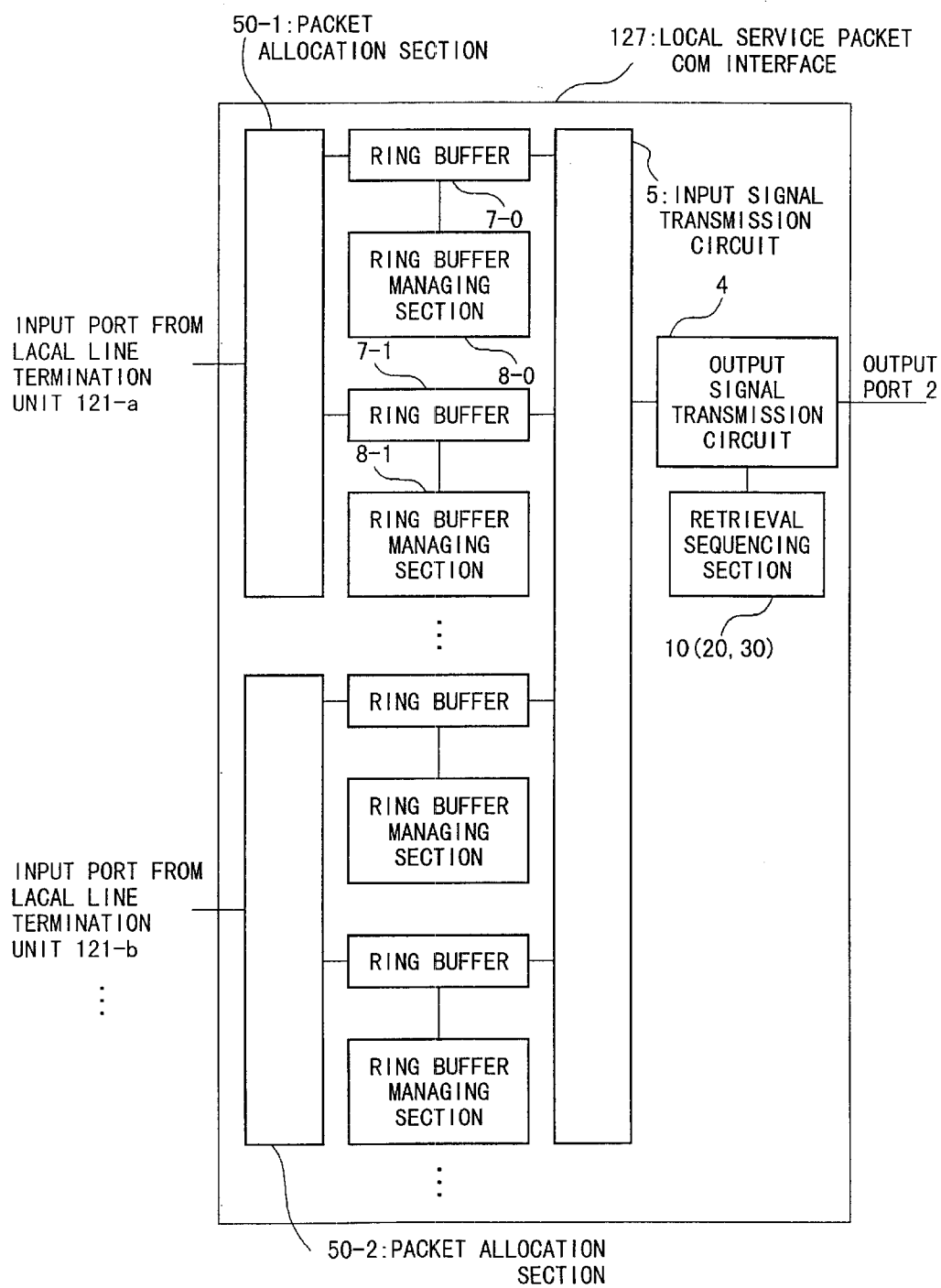
FIG. 9 is a block diagram of another embodiment of the local service packet communication interface.
Figure 10:
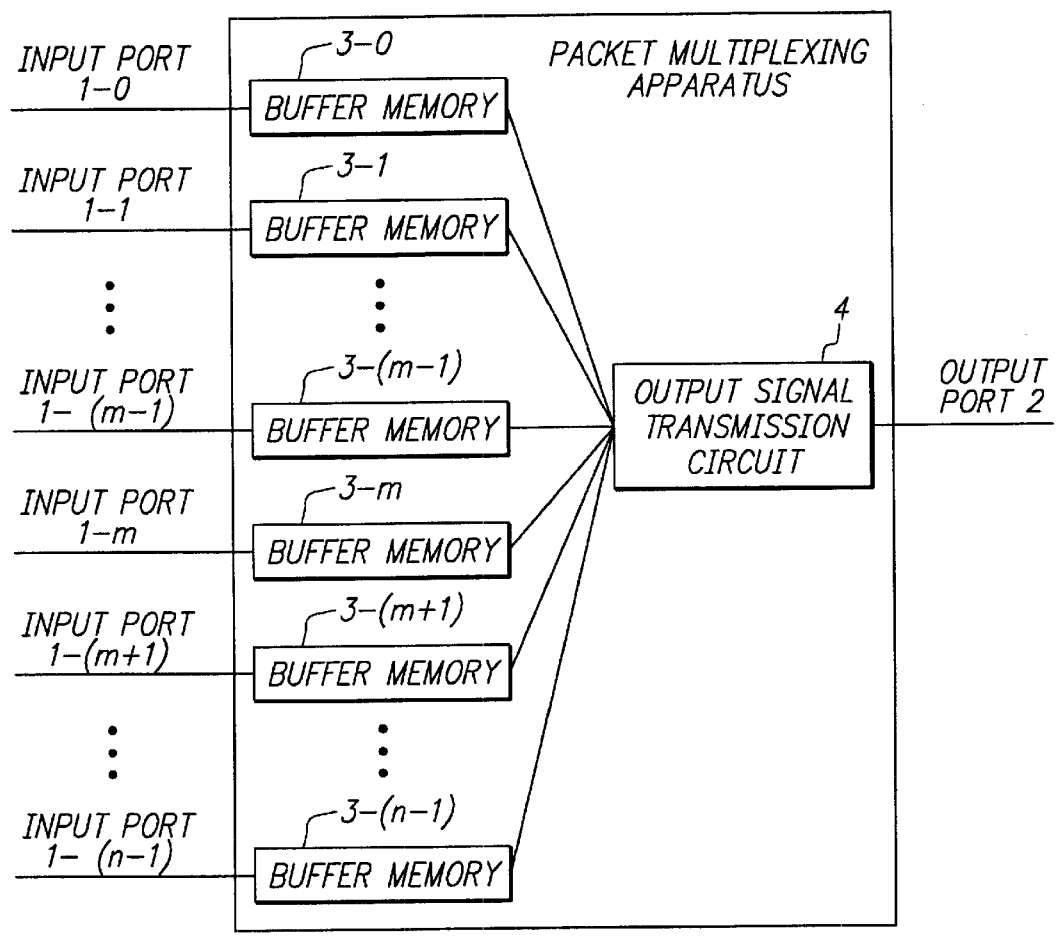
FIG. 10 is a block diagram of a conventional packet multiplexing apparatus.

FIG. 9 shows another configuration of the local service packet com interface 127. The interface 127 has been designed by noting that the packets input to the input ports connected to the local line termination units 121-*a*, 121-*b*, . . . are packets already multiplexed from a plurality of network corn facilities. To guarantee fairness of access for the network com facilities connected to different local line termination units, the local packet com interface 127 is comprised by a ring buffer (7-0, . . . ) and a ring buffer managing section (8-0, . . . ) for each network com facilities, as in Embodiment 6. For this purpose, it has a plurality of packet allocation sections 50-1, 50-2, . . . for allocating, for each original sender of the network corn facilities, the already multiplexed packets by the multiplexing apparatus (comprised by a combination of the network com facilities 110-1, . . . ; optical fibers 140-1~140-n branched or merged through the star coupler 130; and the local line termination units 121-*a*, 121-*b*, . . . ). The packet allocation section allocates packet to individual network corn facilities by referring to identification information for each network com facility contained in each packet. By using such a configuration, local packet com interface 127 can perform packet sequencing as though the interface 127 is connected directly to each network user, thereby enabling to guarantee fairness of packet output for users connected to different local line termination units.

In Embodiment 7, packets input from network com facilities were multiplexed to output port 2 of the local service node 120. But this is not mandatory. For example, the packets input from input ports of the network com facilities 110-1, 110-n connected to local service node 121-*a*, may be looped back at the interface 127, to be output to input ports (not shown) of the cross connect unit 122 of the local line termination unit 121-*b*. The loop-back circuit for the interface 127 is not shown but an equivalent circuit may be configured by connecting the output port 2 to the input port (not shown) for the cross connection unit of the local line termination unit 121-*b*. Such a circuit is able to multiplex packets input into the interface 127 from local line termination units 121-*a*, 121-*c* and other such units, excepting unit 121-*b*, to local line termination unit 121-*b* in the same fair manner as described in this embodiment.

Also, in Embodiment 7, it was assumed that the packet multiplexing apparatus is the same as that presented in Embodiment 6, comprised by a combination of the network com facilities 110-1, . . . ; optical fibers 140-1~140-n branched through the star coupler 130; and the local line termination units 121-*a*, 121-*b*, and others. But, other system configurations are possible so that the apparatuses presented in Embodiments 1–5 are equally applicable.

Similarly, a packet multiplexing apparatus comprised by a service packet corn interface 127 is the same as that presented in Embodiment 6, but other system configurations are possible, so that the apparatuses presented in Embodiments 1–5 are equally applicable.

As explained above, the present packet multiplexing apparatus produces a same waiting time for all the input ports, such that fairness of packet output can be guaranteed for all the input ports.

In the following various communication methods based on a PDS accessing system, comprised by a plurality of network com facilities oppositely connected to one local service node, will be presented.

Initially, technical terms used in the presentation will be clarified.

In the following presentation, "signals" refer to information exchanged between the local service node and the network corn facilities.

"Communication" refers to information containing the data exchanged through the network com facilities and the local service node, and information to be transmitted is data themselves exchanged between such devices as telephones and computers connected to network communication facilities. In the case of telephones, data are voice data; and in the case of computers, data are packets.

Various channels referred to in the present invention are summarized below.

Channels for transmitting signals (commands, instructions and the like) are referred to as "signal channels"; and channels for communicating information are referred to as "communication channels".

Communication channels include shared channels shared by a plurality of network com facilities for transmitting upward information, and more than two frame packets are defined in a shared channel. Also, communication channel may sometimes include circuit channels for connecting to a trunk network. And, shared channels are utilized as LAN channels for connecting local area networks.

Downward signal channels include shared channels for transmitting common signals to be sent to all the network com facilities, and such shared channels may define approval slots to correspond to individual frame packets. Also, downward signal channels may sometimes include individual channels, each having a given fixed bandwidth, for transmitting signals to be sent individually to different network com facilities.

Preferred embodiments of the communication method will be presented in the following.

Embodiment 1 of the Communication Method

Figure 13:
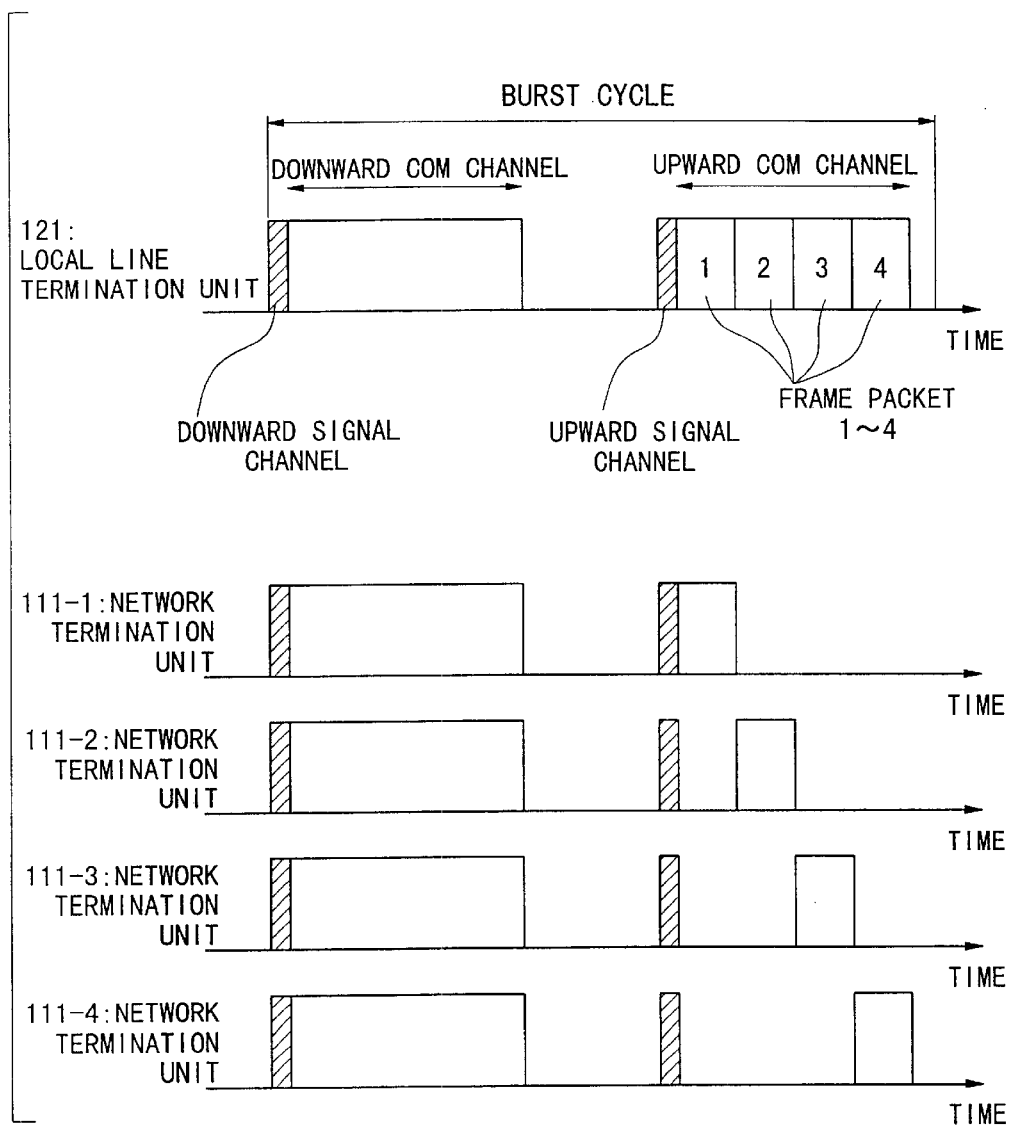
FIG. 13 is a diagram illustrating the communication actions in the first embodiment of the present invention.

FIG. 13 shows a frame packet transmission/reception diagram between network termination units and a local line termination unit in Embodiment 1. The system configuration is the same as the one shown in FIG. 11. For simplification, synchronizing frame for synchronizing the transmission/reception channels and transmission delay time through optical fibers are omitted. In the drawing, four frame packets per one burst cycle T are defined within the upward communication channel, but as will be made clear in the following presentation, this quantity is chosen only for illustrative purposes. Also, four network termination units are shown, but the number of defined frame packets and the number of termination units need not be the same.

Frame packets are identified in sequence as 1, 2, 3 and 4. In response to frame allocation requests from the network termination units 111-1~111-n, the local line termination unit 121-1 sends frame packet identity, through the downward signal channel, to the network termination units asking for transmission approval. Those network termination units receiving frame packet identities transmit data to the respective specified frame packets.

In this process, the start-bit position in each frame packet (bit position within a burst cycle T) and the packet length in the upward communication channel have been predetermined. Thus, each network termination unit that received a frame packet identity begins transmission of data at the start-bit of the frame packet corresponding to the frame packet identity.

FIG. 13 illustrates a case of the network termination units 111-1, 111-2, 111-3, 111-4 sending data in the respective frame packets 1, 2, 3, 4 according to the frame transmission approval.

In this case, it is sufficient for the local line termination unit to provide only the frame packet identities in the frame transmission approval information, so that there is no need to inform, as in the conventional system, data transmission timing within the channel and the approved amount of channel usage for each burst cycle to the network termination units. Further, if the frame packet length is made all uniform in the system, it is free to allocate any frame packet to any network units, thereby further simplifying the control process.

Accordingly, by using the communication method presented above, control of the process is simplified, thus eliminating the need for conventional high-speed circuits and allowing communication to be carried out effectively using circuits of a smaller scale.

Embodiment 2 of the Communication Method

In Embodiment 1, each frame packet was used by different network com facility, but the present system is not limited to such a procedure, and a plurality of frame packets can be allocated to one network com facility.

Figure 14:
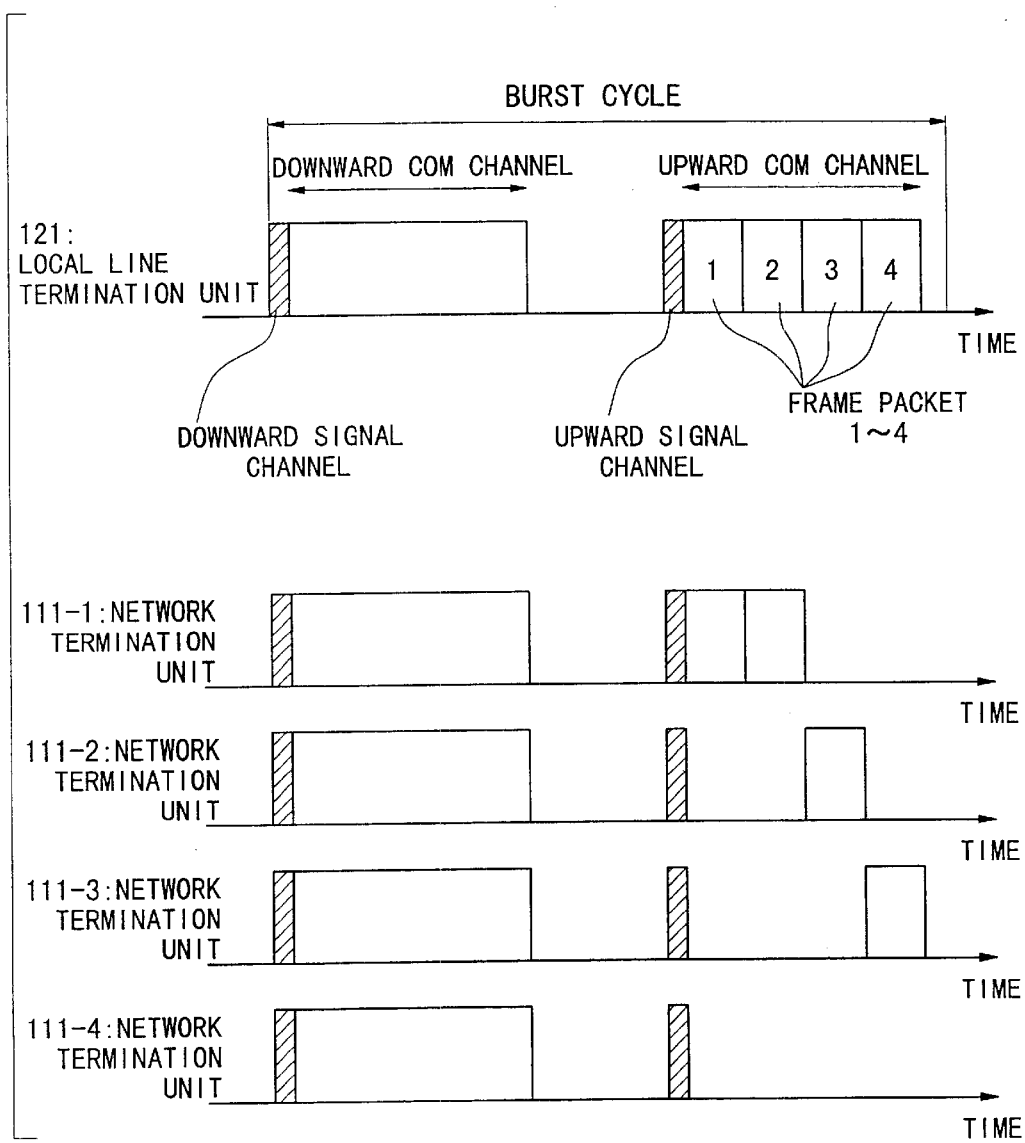
FIG. 14 is a diagram illustrating the communication actions in the second embodiment of the present invention.
Figure 15:
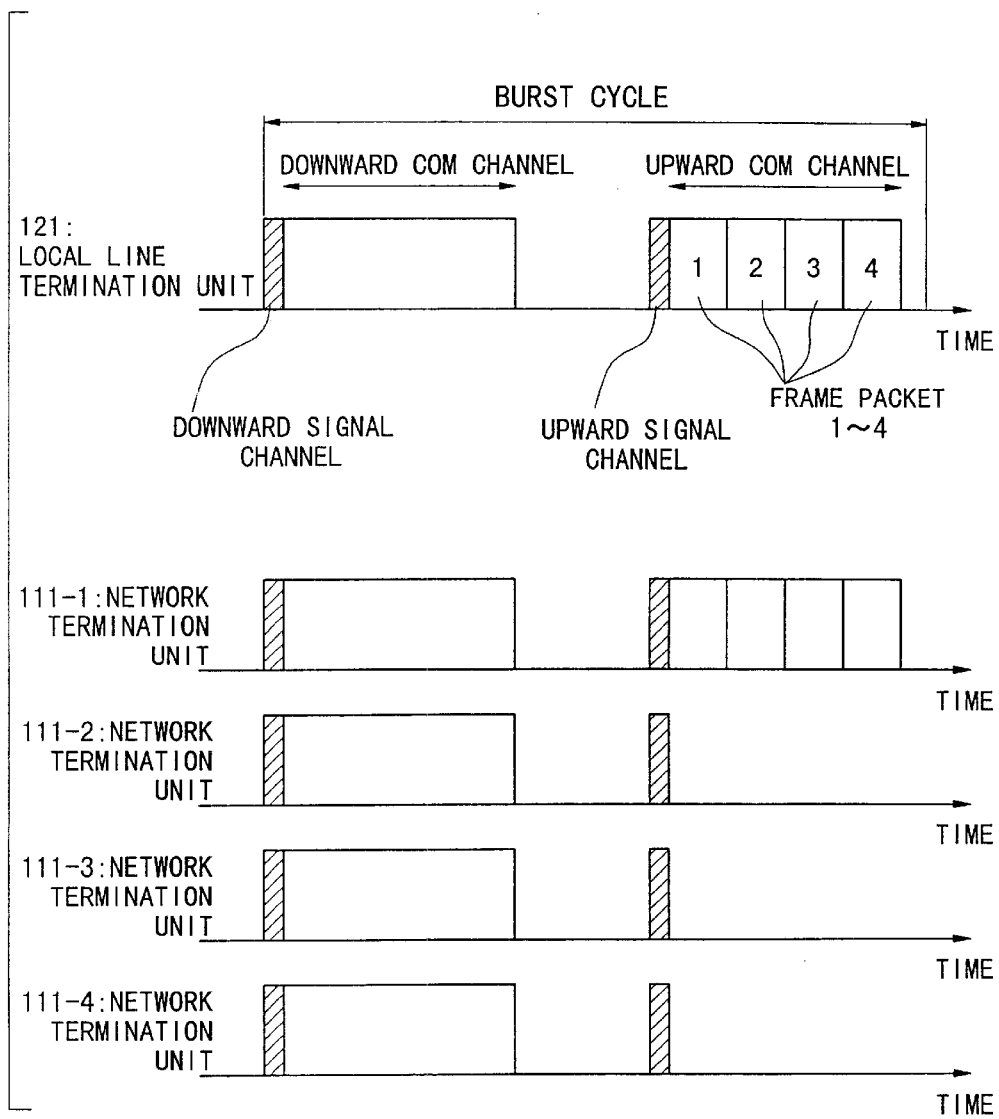
FIG. 15 is a diagram illustrating another method for communication in the second embodiment of the present invention.

FIGS. 14 and 15 illustrate frame packet transmission/reception diagrams between network termination units and a local line termination unit in Embodiment 2. The system configuration is the same as the one shown in FIG. 11. For simplification, synchronizing frame for synchronizing the transmission/reception channels and transmission delay time through optical fibers are omitted. In the drawing, four frame packets per one burst cycle T are defined within the communication channel, but as will be made clear in the following presentation, this quantity is chosen only for illustrative purposes. Also, four network termination units are shown, but the number of defined frame packets and the number of termination units need not to be the same.

Frame packets are named in sequence as 1, 2, 3 and 4. In response to frame allocation requests from the network termination units 111-1~111-n, the local line termination unit 121-1 sends frame packet identities, through the downward signal channel, to the network termination units asking for transmission approval. Those network termination units receiving frame packet identities transmit data to the respective specified frame packets.

FIG. 14 shows a case of the network termination unit 111-1 sending data in frame packets 1, 2 according to the frame transmission approval information and the network termination units 111-2, 111-3, sending respective data in frame packets 3, 4 according to the frame transmission approval information. In this case, the local line termination unit 121-1 uses the signal channel to transmit the information that network termination unit 111-1 to use frame packets 1, 2, and network termination units 111-2, 111-3 to use frame packets 3, 4, respectively.

FIG. 15 shows a case of the network termination unit 111-1 sending data in all the frame packets according to the frame transmission approval information. In this case, the local line termination unit 121-1 uses the signal channel to notify frame packets 1, 2, 3, 4 to the network termination unit 111-1 of the network com facilities 110-1.

Accordingly, by using the communication method presented above, control of the system operation, including allocation of bandwidths to network com facilities, is simplified so that high-speed circuits used in conventional systems are not needed, thereby enabling to communicate using circuits of a smaller scale than those in the conventional systems.

Embodiment 3 of the Communication Method

Embodiments presented so far were related to communication systems dealing in LAN service only, but this embodiment presents a communication method based on multiplexing signals from telephone service for network com facilities having an individually allocated bandwidth, and multiplexing signals from users sharing a common bandwidth in a LAN network.

Figure 16:
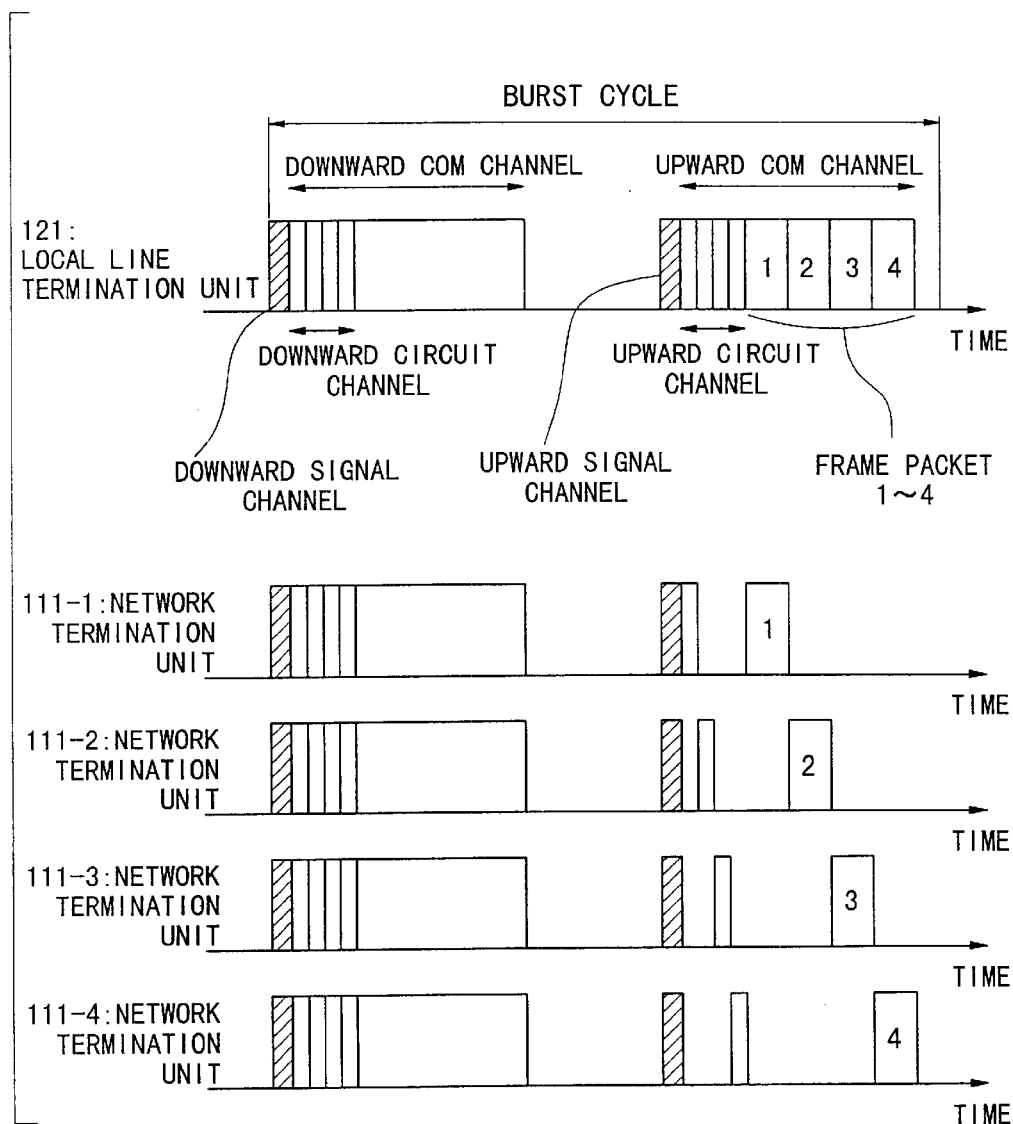
FIG. 16 is a diagram illustrating the communication actions in the third embodiment of the present invention.

FIG. 16 shows a frame packet transmission/reception diagram between network termination units and a local line termination unit in Embodiment 3. The system configuration is the same as the one shown in FIG. 11. For simplification, synchronizing frame for synchronizing the transmission/reception channels and transmission delay time through optical fibers are omitted. Circuit channels for connecting to a trunk network are allocated individually to the network termination units, and each upward channel in a LAN channel are divided into a plurality of frame packets. In other words, the upward circuit channel uses the time-division multiple access (TDMA) system. In this example, there are four frame packets defined in a com channel, but as will be made clear in the following, it is not necessary to restrict to four frame packets. Also, four network termination units are shown but the number of defined frame packets and the number of termination units need not be the same.

Frame packets are named in sequence as 1, 2, 3 and 4. In response to frame allocation requests from the network termination units 111-1~111-n, the local line termination unit 121-1 allocates frame packet identities, through the signal channel, to the network termination units asking for transmission approval. Those network termination units receiving frame packet identities transmit data to the respective specified frame packets.

FIG. 16 shows a case of the network termination units 111-1, 111-2, 111-3, 111-4 sending data in frame packets 1, 2, 3, 4 according to the frame transmission approval information. In this case, the local line termination unit 121-1 uses the circuit channel to allocate frame packet identities 1, 2, 3, 4 to the network termination units 111-1, 111-2, 111-3, 111-4, respectively.

As explained in Embodiments 1 and 2, in this method also, by allocating a plurality of frame packet identities to one network termination unit, this network termination unit can send data to a plurality of frame packets.

Embodiment 4 of the Communication Method

Embodiment 4 presents a method in which the communication system is provided with individual channels having an individually allocated bandwidth for each network communication facilities and a shared channel common to the network communication facilities; and the network communication facilities transmit frame allocation requests through individual channels, and the local line termination unit transmits frame transmission approvals through the shared channel. More precisely, the local line termination unit in the local service node uses approval slots in the shared channel to notify unit identities to those network termination units asking for frame transmission approval.

Figure 17:
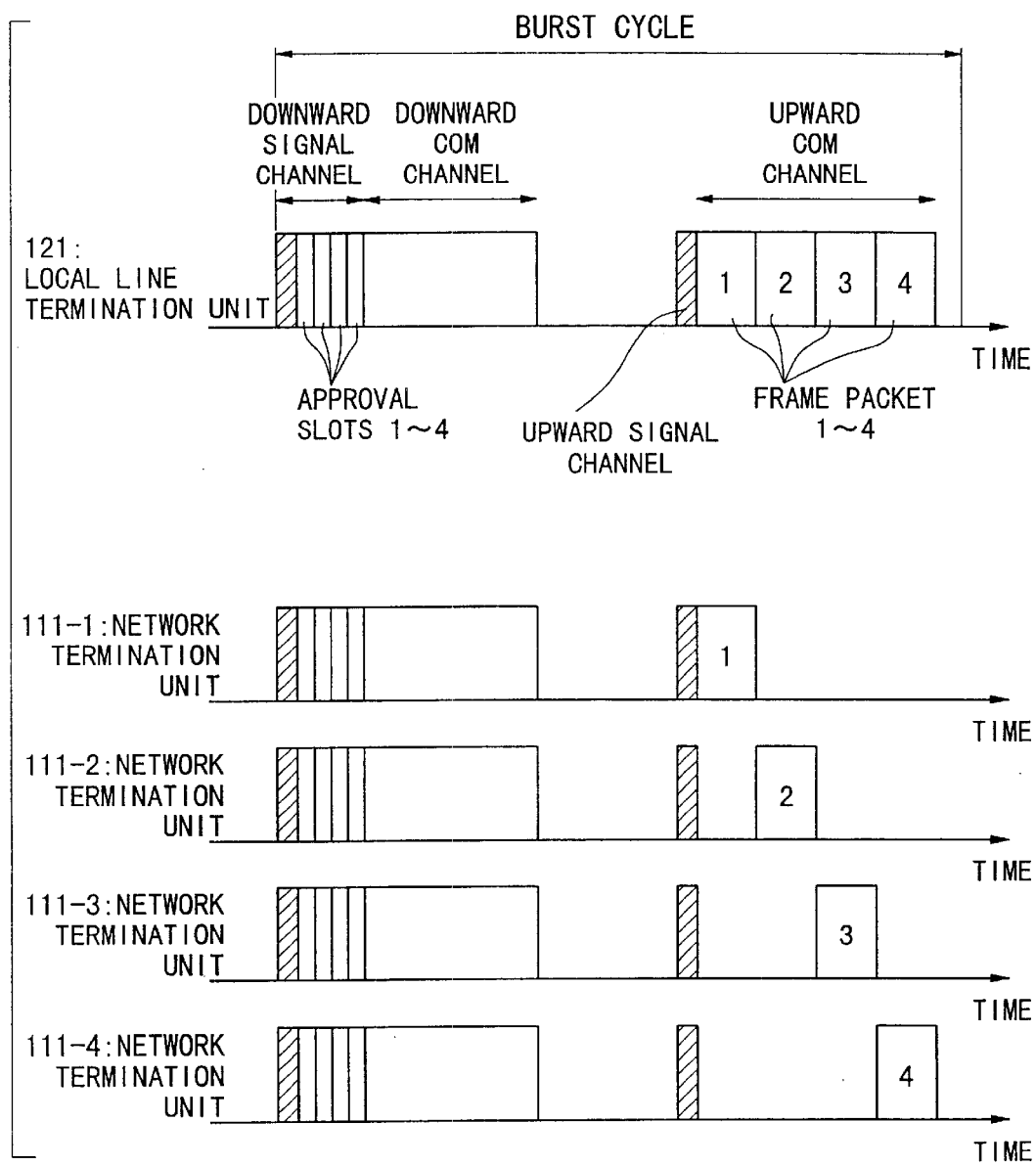
FIG. 17 is a diagram illustrating the communication actions in the fourth embodiment of the present invention.

FIG. 17 shows a communication diagram for Embodiment 4. The system configuration is the same as that shown in FIG. 11, and synchronizing frames and transmission delay through optical fibers are omitted. There are four frame packets identified by 1, 2, 3, and 4. Network termination units are identified by respective IDs, and approval slots, each slot having a length to correspond to the length of each ID, are defined in the shared channel in the downward signal channel. The number of approval channels is the same as the number of frame packets defined in the upward communication channel: approval slot 1 corresponds to frame packet 1; approval slot 2 to frame packet 2; approval slot 3 to frame packet 3; and approval slot 4 to frame packet 4. Four frame packets are defined in this example, but it is not necessary to limit to four frame packets. Also, there are four network termination units but the number of defined frame packets and the number of network termination units need not be the same.

As an example, if the local line termination unit allocates frame packet 1 to network termination unit 1, the ID of the network termination unit 1 is described in approval slot 1. Similarly, approval slots 2~4 are given IDs corresponding to the approved network termination units.

Network termination units read the IDs given in approval slots 1~4, and if own ID is among the list, it assumes that an approval has been given, and sends own data to the frame packet allocated.

FIG. 17 illustrates a case of the network termination units 111-1, 111-2, 111-3, 111-4 sending data in the respective frame packets 1, 2, 3, 4 according to the frame transmission approval information described in the respective approval slots.

Figure 18:
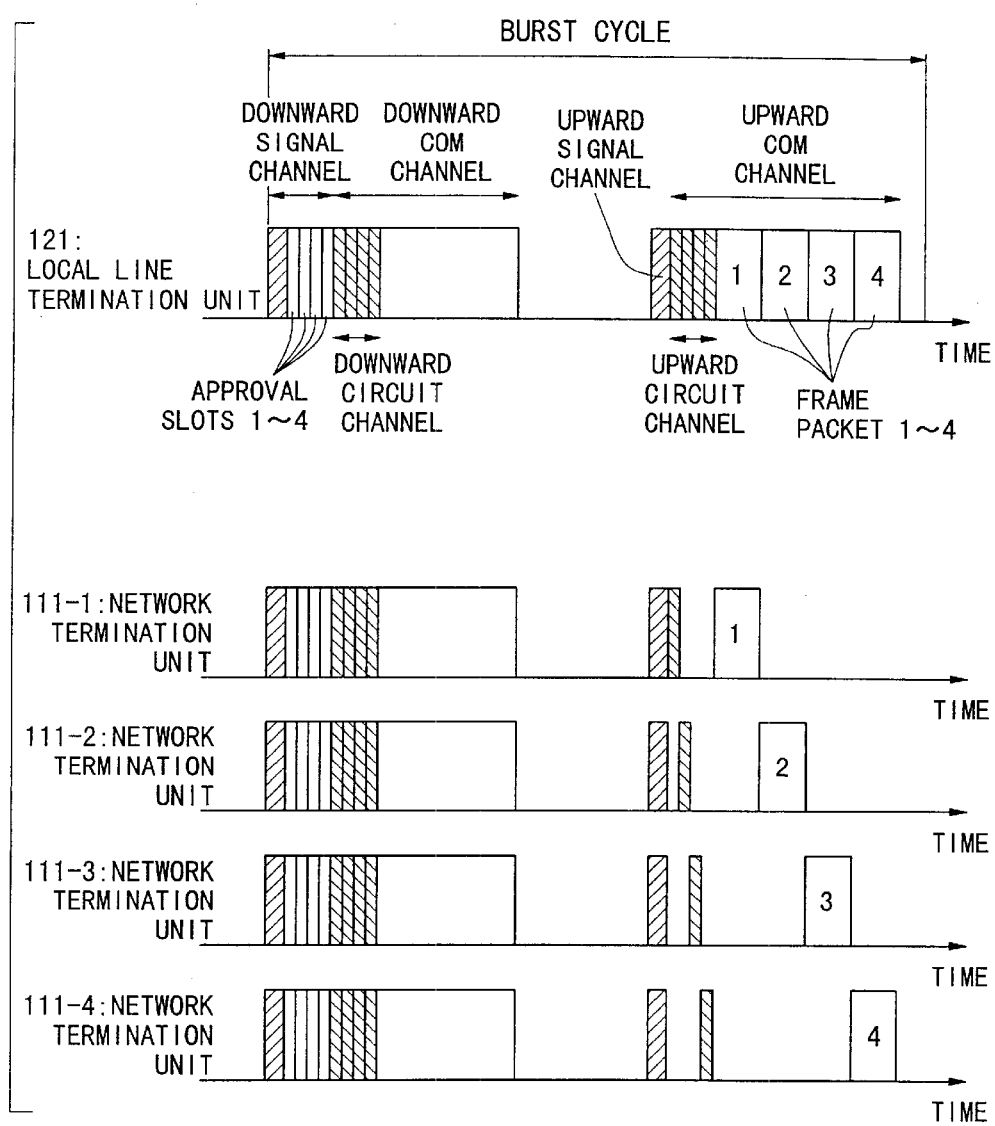
FIG. 18 is a diagram illustrating the communication actions in the fourth embodiment of the present invention.

The following is an explanation for the method of multiplexing signals from telephone service for network com facilities having an individually allocated bandwidth, and multiplexing signals from LAN service for network com facilities sharing a bandwidth in a LAN network. FIG. 18 shows a frame configuration. By defining the frame configuration as illustrated, frame packet allocation can be performed using the same communication method presented above.

The communication method outlined above facilitates allocation of frames to provide an efficient high-speed communication system.

Embodiment 5 of the Communication Method

Embodiment 5 presents a method in which the communication system is provided with individual channels having an individually allocated bandwidth for each network communication facilities and a shared channel common to the network communication facilities; and the network communication facilities transmit frame allocation requests through individual channels, and the local service node transmits frame transmission approvals through the shared channel. More precisely, the local line termination unit in the local service node uses individual channels in the signal channel for sending separate frame transmission approvals to network com facilities having individually allocated bandwidths.

Reviewing the previous embodiment, in Embodiment 4, IDs of the approved network termination units were given in the approval slots of the corresponding frame packets in the downward signal channel. Embodiment 5 differs in that the IDs of the frame packets are given in an approval slot allocated to each individual channel of the network termination unit.

Figure 19:
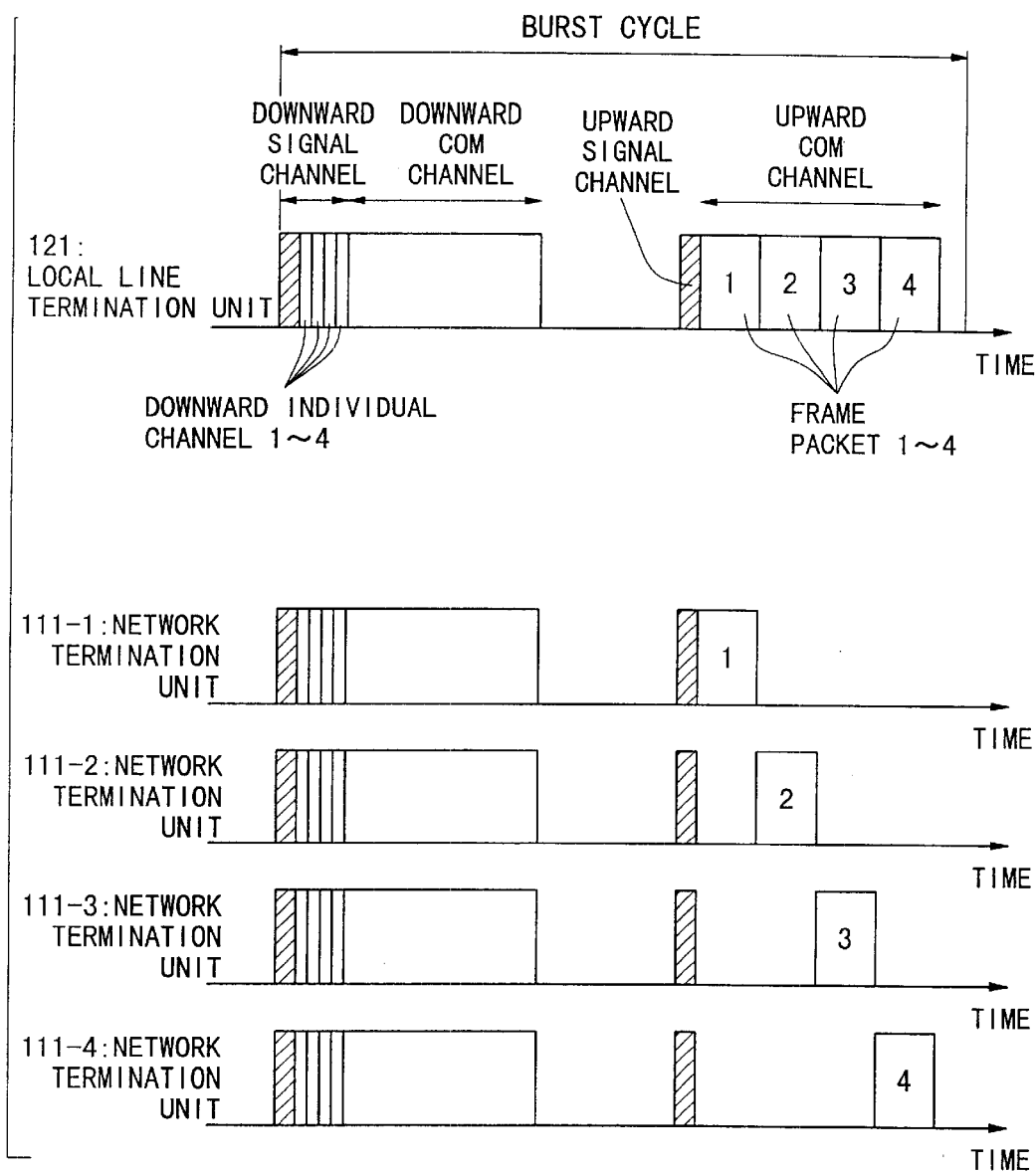
FIG. 19 is a diagram illustrating the communication actions in the fifth embodiment of the present invention.

FIG. 19 shows a communication diagram for Embodiment 5. The system configuration is the same as that shown in FIG. 11, and synchronizing frames and transmission delay through optical fibers are omitted. There are four frame packets 1, 2, 3, 4. Downward signal channel is comprised by shared signal channels for sending signals that are necessary to be transmitted to all the network com facilities, and individual channels for sending signals separately to individual network com facilities. Signals in the shared signal channels can be read by all the network termination units while the individual channels are defined at least one for each network termination units, and each network termination units can only read signals in own individual channel. In this example, four frame packets are defined in the circuit channel, but it is not necessary to restrict to four frame packets. Also, four network termination units are shown but the number of defined frame packets and the number of termination units need not be the same.

The local line termination unit notifies a frame transmission approval to each network termination unit by describing frame packet identities in the individual channels. For example, if the frame packets allocation is to made in the following pattern: frame packets 1, 2 to network termination unit 1; frame packet 3 to termination unit 2; and frame packet 4 to termination unit 3; then, the local line termination unit 121 approves frame transmission by describing frame packet identities 1, 2 in the individual channel for termination unit 1, frame packet identity 3 in the individual channel for unit 2, and frame packet identity 4 in the individual channel for unit 3. Each network termination unit reads own individual channel, and if frame packet identity is described in the channel, data are sent in the frame packets described in the channel. If a frame packet identity is not described in the channel, it assumes that transmission has not been approved, and does not send data.

FIG. 19 shows a communication diagram when an approval is given so that: frame packet 1 is allocated to network termination unit 111-1; frame packet 2 is allocated to network termination unit 111-2; frame packet 3 is allocated to network termination unit 111-3; and frame packet 4 is allocated to network termination unit 111-4.

It should be noted that the multiplexing method presented above is applicable to signals from telephone service for network users, each having an exclusive bandwidth, and to signals from LAN users sharing a common bandwidth in a LAN network.

The communication method outlined above facilitates allocation of frames to provide an efficient high-speed communication system.

Embodiment 6 of the Communication Method

This method of communication is based on the packet multiplexing apparatus described in Embodiment 7 (PDS type optical access system). The system configuration is the same as the one shown in FIG. 8. The communication methods presented in Embodiments 1~5 are based on the PDS optical access system so that these apparatuses are applicable to communication between network termination units and a local line termination unit.

Similar to the operations of the packet multiplexing apparatus in Embodiment 4, the network termination units, having packets to be transmitted to the local service node 120, send packet-notes to respective local line termination units 121. The ring buffer managing sections 8, . . . in each network termination unit calculates respective packet lengths that can be sent if an allocation is given (according to the method explained in Embodiment 6 of the multiplexing apparatus), and calculates the required number of frame packets from the sum of the packet lengths.

Frame request sent from each network termination unit to respective local line termination units 121 contains information related to the number of necessary frame packets.

Local line termination unit 121, receiving packet-notes from those network termination units, outputs frame transmission approvals according to the sequence given by the retrieval sequencing section 10 (or 20 or 30). Frame transmission approval should be configured so as to include information necessary for the network termination units to use the frame packets.

An example case deals with one local service node oppositely connected to four network termination units, and four frame packets are defined in one burst cycle T. As evident in the following presentation, there is no need to match the number of network termination units to the number of frame packets in the burst cycle. Also, it is assumed that the frame packets are identified by 1, 2, 3, 4.

First, according to the operations described above, the frame request patterns are: network termination unit 1 requesting one frame packet; unit 2 requesting two frame packets; unit 3 requesting none; and unit 4 requesting one frame packet. In this case, retrieval sequencing section determines the sequence for the units 1~4 excepting for the unit 3. Suppose the result is a sequence: unit 1, unit 2 and unit 4. In this case, the local line termination unit 121 allocates frame packet 1 to unit 1; frame packets 2, 3 to unit 2; and frame packet 4 to unit 4, and outputs respective frame allocation approvals.

Each network termination unit outputs data in the allocated frame packets in the sequence according to the frame transmission approvals.

Next, another request pattern will be examined. In this case, it is assumed that the pattern is: unit 1 requesting three frame packets; unit 2 requesting two frame packets; unit 3 requesting five frame packets; and unit 4 requesting one frame packet. The retrieval sequencing section determines sequencing for all four termination units 1~4. Suppose the result is a sequence: unit 2; unit 1; unit 4; unit 3. In this case, during the first burst cycle T, the local line termination unit 121 allocates frame packets 1, 2 to unit 2; frame packets 3, 4 to unit 1; and outputs respective frame transmission approvals. Termination units 2 and 1 transmit data using the allocated frame packets, but according to the above allocation sequence, it means that unit 1 could not receive the requested number of frame packets and units 3, 4 could not receive a frame transmission approval.

During the next burst cycle T, the local line termination unit 121 allocates frame packet 1 to unit 1; frame packet 2 to unit 4; frame packets 3, 4 to unit 3; and outputs respective frame transmission approvals. Accordingly, units 1, 4, 3 transmit data using the frame packets allocated thereto. It means that unit 1 has now been allocated the frames missing from the frame request. However, unit 3 was still not able to receive frame packet allocations to satisfy the requested number of frame packets.

During the next burst cycle T, local line termination unit 121 allocates frame packets 1, 2, 3 to network termination unit 3. If, at this point, there are no requests for frame allocation by any network termination units, frame packet 4 is not used, but if there are allocation requests from other network termination units, frame packet 4 is allocated by following the procedure described earlier.

By using such a communication method and the packet multiplexing apparatus of the present invention, it is possible to assure fairness of data transmission among the network users.

It is clear that the present method of communication enables to provide efficient high-speed data delivery, by simplifying the process of control of multiplexing packets, including bandwidth allocation to individual channels.

In this particular example, the type of service with individual channel allocation was exemplified using telephone switching circuits, but the method is equally applicable to other similar communication systems such as integrated service digital networks (ISDN).

As demonstrated in the above presentations, the method of communication disclosed in the present invention eliminates the need for informing the network termination units of timing of data transmission and usable channel allocation, for each burst cycle (repeated cycles of transmission/reception), which have been required in the conventional communication methods. The entire process of control, including allocation of bandwidths, has been simplified using circuits of a smaller scale and without high-speed circuits.

What is claimed is:

1. A packet multiplexing apparatus comprising:
   input ports for inputting a packet in a respective input port;
   buffer memories provided for each input port for temporary storage of a packet;
   an output signal transmission circuit for retrieving a packet from each buffer memory in a specific sequence;
   an output port for transmitting packets output from said output signal transmission circuit; and
   a retrieval sequencing section for controlling said specific sequence by changing a retrieving order of packets from buffer memories for each complete round of packet retrieval so that a frequency of said retrieving order for each input port is uniformly shared by said input ports.

2. A packet multiplexing apparatus according to claim 1, wherein said retrieval sequencing section controls said specific sequence by changing a retrieving order of packets from buffer memories, for each complete round of packet retrieval, so that a frequency of said retrieving order is uniformly shared by said input ports, and that a combination of two adjacent input ports in said specific sequence is uniformly distributed among said input ports.

3. A packet multiplexing apparatus comprising:
   input ports for inputting a packet in a respective input port;
   a buffer memory provided for each input port for temporary storage of a packet;
   an output signal transmission circuit for retrieving a packet from each buffer memory in a specific sequence;
   an output port for transmitting packets output from said output signal transmission circuit;
   an input signal transmission circuit for transmitting information on presence or absence of a packet in each buffer memory to said output signal transmission circuit;
   wherein
     said output signal transmission circuit includes a function to send a packet transmission approval for an input port reporting a packet presence to said input signal transmission circuit; and further comprises,
     a retrieval sequencing section for controlling said specific sequence by changing an approving order of packets for each complete round of packet retrieval from input ports reporting a packet presence, so that a frequency of said approving order is uniformly shared by input ports reporting a packet presence.

4. A packet multiplexing apparatus according to claim 3, wherein said retrieving sequencing section controls said specific sequence by changing an approving order of packets for input ports reporting a packet presence, for each complete round of packet retrieval, so that a frequency of said approving order is uniformly shared by input ports, and that a combination of two adjacent input ports in said specific sequence is uniformly distributed among input ports.

5. A packet multiplexing apparatus according to claim 1, wherein said retrieval sequencing section is provided with counters, and said specific sequence is determined by computation based on output values of said counters.

6. A packet multiplexing apparatus according to claim 3, wherein said retrieval sequencing section is provided with counters, and said specific sequence is determined by computation based on output values of said counters.

7. A packet multiplexing apparatus according to claim 1, wherein said retrieval sequencing section is provided with a table containing sequences of input ports for retrieving packets, and said specific sequence is determined according to said table.

8. A packet multiplexing apparatus according to claim 3, wherein said retrieval sequencing section is provided with a table containing sequences of input ports for retrieving packets, and said specific sequence is determined according to said table.

9. A packet multiplexing apparatus according to claim 1, further comprising:
   means for determining a retrieval sequence according to a packet arrival sequence when two packets or more are stored in said buffer memory, and for determining a number of packets to be retrieved from said buffer memory while keeping a total length of said retrieved packets to be less than a given value.

10. A packet multiplexing apparatus according to claim 3, further comprising:
    means for determining a retrieval sequence according to a packet arrival sequence when two packets or more are stored in said buffer memory, and for determining a number of packets to be retrieved from said buffer memory while keeping a total length of said retrieved packets to be less than a given value.

11. A packet multiplexing apparatus according to claim 1, wherein:
    said buffer memory provided for each input port is a ring buffer divided into a plurality of ring sections having a specific length; and
    said apparatus further comprises means for retrieving all packets having tail data in a ring section in an input order of packets, when each packets input from input ports are stored successively in corresponding ring buffer.

12. A packet multiplexing apparatus according to claim 3, wherein:
    said buffer memory provided for each input port is a ring buffer divided into a plurality of ring sections having a specific length; and
    said apparatus further comprises means for retrieving all packets having tail data in a ring section in an input order of packets, when each packets input from input ports are stored successively in corresponding ring buffer.

13. A packet multiplexing apparatus according to claim 1, wherein:
    said apparatus operates in a communication system in which network communication facilities are oppositely connected to a local service node through branching transmission lines;
    wherein
      and said input ports are provided for each network termination facility; and
      said output ports are provided on said local service node.

14. A packet multiplexing apparatus according to claim 3, wherein:

said apparatus operates in a communication system in which network communication facilities are oppositely connected to a local service node through branching transmission lines;

wherein and said input ports are provided for each network termination facility; and said output ports are provided on said local service node.

15. A communication method for exchanging information in a communication system comprised by network communication facilities oppositely connected through branching transmission lines to a local service node, by time division multiplexing of upward communication signals, flowing from said network communication facilities to said local service node, and downward communication signals, flowing from said local service node to said network communication facilities, wherein said communication system is provided with a shared channel common to network communication facilities for transmitting upward information; and said shared channel contains not less than two frame packets;

said method comprising the steps of:

network communication facilities, having upward data, transmitting frame allocation requests to said local service node;

said local service node, in response to frame allocation requests from said network communication facilities, transmitting frame transmission approvals allocated in units of frame packets to said network communication facilities;

said network communication facilities transmitting to said local service node said upward data in respective allocated frame packets chosen from a plurality of frame packets in sail shared channel; and controlling packet retrieval sequence by changing a retrieving order of packets from said network communication facilities for each complete round of packet retrieval so that a frequency of said retrieving order for each network communication facilities is uniformly shared by said network communication facilities.

16. A communication method according to claim 15, wherein said, local service node allocates one or-not less than two. frame packets to one network communication facility.

17. A communication method according to claim 16, wherein said network communication facility includes information on a required number of frame packets in said frame allocation request to be transmitted to said local service node.

18. A communication method according to claim 15, wherein said communication system is provided with individual channels having an individually allocated bandwidth for each of said network communication facilities and a shared channel common to said network communication facilities; wherein said network communication facilities transmit frame allocation requests through individual channels, and said local service node transmits frame transmission approvals through said shared channel.

19. A communication method according to claim 18, wherein a downward shared channel for transmitting downward information is provided with ID slots for describing facility identifications, for identifying individual network communication facilities, to correspond to a number of frame packets to be transmitted in upward shared channels;

wherein each ID slot is defined in a 1:1 relationship with each frame packet; and said local service node transmits a frame transmission approval by describing a facility identification in an ID slot corresponding to a frame packet allocated to respective network communication facility.

20. A communication method according to claims 15, wherein said communication system is provided with individual channels having an individually allocated bandwidth for each of said network communication facilities and a shared channel common to said network communication facilities; wherein said network communication facilities transmit frame allocation requests through individual channels, and said local service node transmits frame transmission approvals through said individual channel.

21. A communication method according to claim 20, wherein:

said frame packets are managed by identification numbers; and said local service node sets an identification number of allocated frame packet in the frame packet approvals and transmitted the frame packet approvals to individual network communication facilities.

22. A communication method according to claim 15, wherein each frame packet has an identical length.

23. A packet multiplexing apparatus according to claim 14, wherein:

communication in the apparatus is performed a communication method using time division multiplexing of upward communication signals, flowing from said network communication facilities to said local service node, and downward communication signals, flowing from said local service node to said network communication facilities;

the apparatus is provided with a shared channel common to network communication facilities for transmitting upward information; and said shared channel contains not less than two frame packets; and wherein said method comprising the steps of:

network communication facilities, having upward data, transmitting frame allocation requests to said local service node;

said local node, in response to frame allocation requests from said network communication facilities, transmitting frame transmission approvals allocated in units of frame packets to said network communication facilities; and said network communication facilities transmitting to said local service node said upward data in respective allocated frame packets chosen from a plurality of frame packets in said shared channel.

* * * * *